(12) United States Patent
Christe

(10) Patent No.: US 12,316,236 B2
(45) Date of Patent: May 27, 2025

(54) METHOD FOR OPERATING A CONVERTER, CONVERTER AND COMPUTER PROGRAM PRODUCT

(71) Applicant: Hitachi Energy Ltd, Zürich (CH)

(72) Inventor: Alexandre Christe, Bern (CH)

(73) Assignee: HITACHI ENERGY LTD, Zürich (CH)

( * ) Notice: Subject to any disclaimer, the term of this patent is extended or adjusted under 35 U.S.C. 154(b) by 85 days.

(21) Appl. No.: 18/280,115

(22) PCT Filed: Mar. 4, 2021

(86) PCT No.: PCT/EP2021/055487
§ 371 (c)(1),
(2) Date: Sep. 1, 2023

(87) PCT Pub. No.: WO2022/184261
PCT Pub. Date: Sep. 9, 2022

(65) Prior Publication Data
US 2024/0162828 A1   May 16, 2024

(51) Int. Cl.
*H02M 5/27* (2006.01)
*H02M 7/797* (2006.01)

(52) U.S. Cl.
CPC ........... *H02M 5/271* (2013.01); *H02M 7/797* (2013.01)

(58) Field of Classification Search
CPC ...... H02M 5/271; H02M 5/272; H02M 5/273; H02M 5/275; H02M 5/293; H02M 5/2932;
(Continued)

(56) References Cited

U.S. PATENT DOCUMENTS 8,130,102 B1 * 3/2012 Nguyen .......... F25D 29/00
340/3.1
2014/0103887 A1 4/2014 Akagi et al.
(Continued)

FOREIGN PATENT DOCUMENTS

CN 103280820 A 9/2013
CN 108432108 A 8/2018
(Continued)

OTHER PUBLICATIONS

Kammerer et al: "Fully decoupled current control and energy balancing of the Modular Multilevel Matrix Converter", Power Electronics and Motion Control Conference (EPE/ PEMC), 2012 15th International, IEEE, Sep. 4, 2012 (Sep. 4, 2012), XP032312010, DOI: 10.1109/EPEPEMC.2012.6397408 ISBN: 978-1-4673-1970-6, pp. LS2a.3-I-LS2a.3-8.
(Continued)

*Primary Examiner* — Nguyen Tran
(74) *Attorney, Agent, or Firm* — PROCOPIO, CORY, HARGREAVES & SAVITCH LLP

(57) ABSTRACT

A method is configured for operating a converter (10) which is implemented as a modular-multilevel converter and comprises a control arrangement (38) and a number M of phase-legs (21 to 29). The method comprises detecting whether the converter (10) has to be set into one mode of a group comprising a static synchronous compensator mode or a grid unbalance mode, generating mode control signals (MCS) depending on the detected mode, generating balance voltage reference signals ($u_{bal,ref}$) depending on a first side frequency ($\omega_g$), a second side frequency ($\omega m$), second side current reference signals ($im,ref$) and the mode control signals (MCS), generating a phase-leg control signal ($u_{ref}$), generating cell control signals (51 to S4) and providing the
(Continued)

cell control signals (51 to S4) to semiconductor switches (41 to 44) of cells (31) of the phase-legs (21 to 29).

17 Claims, 8 Drawing Sheets

(58) Field of Classification Search
CPC ...... H02M 5/2935; H02M 5/297; H02M 5/32; H02M 5/27; H02M 5/2576; H02M 5/2573; H02M 5/257; H02M 5/22; H02M 5/225; H02M 7/797; H02M 7/8179; H02M 7/77; H02M 7/758; H02M 7/7575
See application file for complete search history.

(56) References Cited

U.S. PATENT DOCUMENTS

2020/0235675 A1* 7/2020 Dallmer-Zerbe ... H02M 7/4835
2023/0318474 A1* 10/2023 Vasiladiotis .......... H02M 5/297
363/74

FOREIGN PATENT DOCUMENTS

| CN | 110198046 A | 9/2019 |
|---|---|---|
| EP | 3363090 A1 | 8/2018 |
| WO | 2017/064478 A1 | 4/2017 |

OTHER PUBLICATIONS

Li et al: "Investigation of MMC-HVDC operating region by circulating current control under grid imbalances", Electric Power Systems Research, Elsevier, Amsterdam, NL, vol. 152, Jul. 22, 2017 (Jul. 22, 2017), pp. 211-222, XP085183507, Issn: 0378-7796, DOI: 10.1016/J.EPSR.2017.07.00.

Liu et al: "DC Voltage Ripple Optimization of a Single-Stage Solid State Transformer Based on the Modular Multilevel Matrix Converter", IEEE Transactions on Power Electronics, Institute of Electrical and Electronics Engineers, USA, vol. 35, No. 12, Dec. 2020, pp. 12801-12815, XP011802936, ISSN: 0885-8993, DOI: 10.1109/TPEL.2020.2992707 [retrieved on Aug. 4, 2020].

Liu et al: "Analysis and Control of the Modular Multilevel Matrix Converter Under Unbalanced Grid Conditions", IEEE Journal of Emerging and Selected Topics in Power Electronics, IEEE, Piscataway, NJ, USA, vol. 6, No. 4, Dec. 1, 2018 (Dec. 1, 2018), pp. 1979-1989, XP011693923, ISSN: 2168-6777, DOI: 10.1109/JESTPE.2018.2812723 [retrieved on Oct. 30, 2018].

Liu et al: "Voltage Fluctuation and Comprehensive Control of Multilevel Power Conditioner for Railway Traction System", 2018 IEEE International Power Electronics and Application Conference and Exposition (PEAC), IEEE, Nov. 4, 2018 (Nov. 4, 2018), pp. 1-6, XP033476678, DOI: 10.1109/PEAC.2018.8589970 [retrieved on Dec. 26, 2018].

Liu et al., "Analysis and Control of the Modular Multilevel Matrix Converter Under Unbalanced Grid Conditions" IEEE Journal of Emerging and Selected Topics in Power Electronics, vol. 6, No. 4, Dec. 2018, pp. 1979-1989.

Wang et al., "Circulating Current Suppression for MMC-HVDC under Unbalanced Gnd Conditions", IEEE Transactions on Industry Applications, IEEE Service Center, Piscataway, NJ, US, vol. 53, No. 4, Jul. 1, 2017 (Jul. 1, 2017), pp. 3250-3259, XP011656720, ISSN: 0093-9994, DOI: 10.1109/TIA.2017.2675992 [retrieved on Jul. 17, 2017].

Yue et al "Closed-Loop Decoupled Control and Implementation of the Modular Multilevel Matrix Converter in Similar/Equal Frequency Operation", 2020 IEEE 9th International Power Electronics and Motion Control Conference (IPEMC2020-ECCE Asia), IEEE, Nov. 29, 2020 (Nov. 29, 2020), pp. 3385-3390, XP033883963, DOI: 10.1109/IPEMC-ECCEASIA48364.2020.9367902 [retrieved on Mar. 2, 2021].

\* cited by examiner

METHOD FOR OPERATING A CONVERTER, CONVERTER AND COMPUTER PROGRAM PRODUCT

The disclosure is related to a method for operating a converter, a converter and a computer program product.

The converter converts electric power. For example, the converter converts high voltage alternating current (AC) with a first frequency to high voltage alternating current with a second frequency, abbreviated as AC/AC converter. Alternatively, the converter converts electric power from high voltage alternating current to high voltage direct current (DC) or vice versa. Often a converter is realized bi-directionally. Thus, the converter can convert electric power from a first side of the converter to a second side of the converter and also from the second side to the first side. The AC voltage may be provided using three phases or a single phase. An AC/AC conversion can be performed e.g. with a direct frequency converter. The converter often is implemented as a modular-multilevel converter (abbreviated as MMC).

The publication "Comparison of Cascaded Multilevel Converter Topologies for AC/AC Conversion", K. Ilves et al., IEEE, 2014 International Power Electronics Conference shows that a direct MMC performs better compared to a back-to-back MMC in terms of capacitor voltage ripple when the system operates with significant input/output frequency difference.

A control of an MMC should also be configured for special operating modes, where either one terminal has no voltage or grid unbalances. Regarding the first case, such a condition may arise in variable-speed pumped hydro storage plants with a machine at standstill and the converter optionally running in a static synchronous compensator mode on the grid. The static synchronous compensator mode can be abbreviated STATCOM mode. The STATCOM mode could also be foreseen in a converter-fed synchronous condenser. The second case is linked with the fault ride-through capability of the converter which is defined in relevant grid codes.

Document WO 2011/067090 A2 describes a method for operating an inverter circuit.

Embodiments of the disclosure relate to a method for operating a converter, a converter and a computer program product for a control of a converter during special operating modes.

The object is achieved by the subject-matter of the independent claims. Further developments are described in the dependent claims.

The definitions as described above also apply to the following description unless otherwise stated.

There is provided a method for operating a converter. The converter comprises a control arrangement, a first side, a second side and a number M of phase-legs which are arranged between the first side and the second side. The converter is implemented as a modular-multilevel converter. Each of the number M of phase-legs comprises at least a cell with a capacitor and semiconductor switches. The method comprises:
- detecting whether the converter has to be set or is to be set to one mode of a group comprising: a static synchronous compensator mode or a grid unbalance mode,
- generating mode control signals depending on the detected mode,
- generating balance voltage reference signals depending on a first side frequency, a second side frequency, second side current reference signals, measured phase-leg capacitor signals and the mode control signals by the control arrangement,
- generating a phase-leg control signal for each of the number M of phase-legs depending on first side voltage reference signals, second side voltage reference signals and the balance voltage reference signals by a reference generator of the control arrangement,
- generating cell control signals by a modulator of the control arrangement as a function of the phase-leg control signals, and
- providing the cell control signals to the semiconductor switches of the cells.

Advantageously, the cell control signals are generated as a function of the mode control signals. Thus, the converter can react on the static synchronous compensator mode and/or the grid unbalance mode. The converter automatically switches from a normal operating mode to the static synchronous compensator mode and/or the grid unbalance mode. The step of setting the converter to one mode of the above mentioned group is realized such that e.g. the converter is automatically activated into one mode of this group or the converter sets itself into one mode of this group.

In a development of the method, the control arrangement is configured for a normal operating mode and the static synchronous compensator mode. The control arrangement is not configured for the grid unbalance mode.

In an alternative development of the method, the control arrangement is configured for the normal operating mode and the grid unbalance mode. The control arrangement is not configured for the static synchronous compensator mode.

In a further alternative development of the method, the control arrangement is configured for a normal operating mode, the static synchronous compensator mode and the grid unbalance mode.

In a development of the method, the static synchronous compensator mode (abbreviated STATCOM mode) is set in case a voltage of at least one terminal on the first side of the converter has constantly zero Volt and/or a machine coupled to the second side of the converter has a standstill. Thus, the STATCOM mode can handle grid faults and asymmetries.

In a development of the method, the grid unbalance mode is set in case voltages at terminals on the first side of the converter are unbalanced. In the grid unbalance mode, the second side of the converter is energized; thus, voltages at terminals on the second side of the converter are present (and are not zero).

In a development of the method, the first side of the converter is a grid side of the converter. The second side of the converter is a machine side of the converter or a further grid side. The first side voltage reference signals are e.g. grid voltage reference signals. The second side voltage reference signals are e.g. machine voltage reference signals or further grid voltage reference signals. The first side frequency is e.g. a frequency of a grid coupled to the first side of the converter. The second side frequency is e.g. a frequency of a machine, motor or further grid. The machine, the motor or the further grid is coupled to the second side of the converter. The first side current reference signals are e.g. grid current reference signals. The second side current reference signals are e.g. machine current reference signals.

In a development of the method, the first side current reference signals are generated depending on the mode control signals by a first side control module of the control arrangement. The balance voltage reference signals are generated by a current control module of an inner control module of the control arrangement depending on the first side current reference signals, the second side current reference signals and current balance reference signals.

In an alternative or additional development of the method, the balance voltage reference signals are generated by the current control module of the inner control module of the control arrangement depending on first side current reference signals, the second side current reference signals, the mode control signals and the current balance reference signals.

In a development of the method, the mode control signals can either be applied to the first side control module or the current control module or to both modules.

In a development of the method, the reference generator adds and/or subtracts at least the first side voltage reference signals, the second side voltage reference signals and the balance voltage reference signals to generate phase-leg control signals for the number M of phase-legs.

In a development of the method, the modulator provides the switch position to the cells. The modulator can be deployed in different ways (local or distributed). In an example, the modulator is realized as an arrangement of pulse-width modulators. In an example, each cell of the number M of phase-legs is controlled by its own pulse-width modulator.

In a development of the method, the balance voltage reference signals are generated by a current control module of the inner control module depending on the first side current reference signals, the second side current reference signals, current balance reference signals and the mode control signals. Thus, the current control module has four inputs.

In a development of the method, the current balance reference signals are generated by a decoupling matrix module of the inner control module depending on current balance signals.

In a development of the method, the current balance signals are generated by a voltage control module of the inner control module depending on clock signals and measured phase-leg capacitor signals.

In a development of the method, the measured phase-leg capacitor signals are measured at the cells of the number M of phase-legs, e.g. by adding voltages of or at the cells of a phase-leg of the number M of phase-legs or averaging voltages at the cells of a phase-leg of the number M of phase-legs. The voltage at a cell is e.g. a voltage at a capacitor of the cell. One of the measured phase-leg capacitor signals represents the sum or the average of the voltage at the cells of one phase-leg. One of the measured phase-leg capacitor signals represents the sum or the average of the voltage of the capacitor of the cells of one phase-leg. For example, a phase-leg comprises a number N of cells. Each cell has a capacitor with a voltage between the two electrodes of the capacitor. Thus, a measured phase-leg capacitor signal represents the sum or the average of the number N of voltages of the capacitors of the cells of a phase-leg. The value of the average is the value of the sum divided by the number N. In an example, the amount of the voltage is used for calculating the sum and/or average and thus for determining a measured phase-leg capacitor signal; in this case, a measured phase-leg capacitor signal has only positive values or is zero. The converter includes e.g. nine phase-legs. In this case, there are nine measured phase-leg capacitor signals.

In a development of the method, the clock signals are generated as a function of the first side frequency and the second side frequency by the inner module. The clock signals are retrieved using the frequency information from either side control (where there could be a phase-locked loop, a power synchronization loop or another circuit). The clock signals may be generated by the control arrangement by applying an algorithm (e.g. performed by a digital controller of the control arrangement).

In a development of the method, in case the converter is set to the static synchronous compensator mode, the mode control signals are generated as a function of rescaled signals generated by a rescale module of the control arrangement depending on a first, a second and a third evaluated current balance signal. The converter automatically performs the switch-over between the modes. The control arrangement is configured to autonomously set the modes. The converter is set to a mode means that the converter is automatically activated into this mode.

In a further development of the method, the first evaluated current balance signal is generated by a first evaluating module of the rescale module depending on a first, fourth and seventh current balance signal. The second evaluated current balance signal is generated by a second evaluating module of the rescale module depending on a second, fifth and eighth current balance signal. The third evaluated current balance signal is generated by a third evaluating module of the rescale module depending on a third, sixth and ninth current balance signal. The first to the ninth current balance signal is determined at a first to a ninth phase-leg of the converter. The first, fourth and seventh current balance signal is measured at the first, fourth and seventh phase-leg which are connected to a first terminal of the first side of the converter. The second, fifth and eighth current balance signal is measured at the second, fifth and eighth phase-leg which are connected to a second terminal of the first side of the converter. The third, sixth and ninth current balance signal is measured at the third, sixth and ninth current phase-leg which are connected to a third terminal of the first side of the converter. The first to the ninth current balance signal is determined e.g. by measuring a current flowing through the corresponding phase-leg.

In a development of the method, the first evaluated current balance signal is generated by the first evaluating module by averaging the first, the fourth and the seventh current balance signal. The first evaluated current balance signal is generated by the first evaluating module by averaging the current balancing signals corresponding to the first phase of the first side of the converter (also named ac side). Moreover, the second evaluated current balance signal is generated by the second evaluating module by averaging the second, the fifth and the eighth current balance signal. The second evaluated current balance signal is generated by the second evaluating module by averaging current balancing signals corresponding to the second phase of the first side. Correspondingly, the third evaluated current balance signal is generated by the third evaluating module by averaging the third, the sixth and the ninth current balance signal. The third evaluated current balance signal is generated by the third evaluating module by averaging the current balancing signals corresponding to the third phase of the first side.

In a development of the method, the mode control signals are generated as a function of the rescaled signals and clock signals by a multiplication module of the rescale module.

In a development of the method, in case the converter is set to the static synchronous compensator mode, the mode control signals are generated as a function of common mode voltage signals. The common mode voltage signals are generated by a processing module of the control arrangement as a function of measured signals. The common mode voltage signals comprise a common mode voltage amplitude and a common mode voltage angle.

In a development of the method, the measured signals are detected by measuring at least one of an AC voltage at the first or the second side, a DC voltage at a capacitor of a cell of a phase-leg of the number M of phase-legs, the measured phase-leg capacitor signals, a current at the first or the second side and a current flowing through a phase-leg of the number M of phase-legs. The measured signals may include at least one of the measured phase-leg capacitor signals, an AC voltage at the first or the second side, a DC voltage at a capacitor of a cell of a phase-leg of the number M of phase-legs, a current at the first or the second side and a current flowing through a phase-leg of the number M of phase-legs. One or a subset of the signals, voltages and currents mentioned above can be selected to generate the measured signals or to be included by the measured signals. The converter comprises current sensors and/or voltage sensors to generate the measured signals. The currents at the first or the second side of the converter could be retrieved also by linear combination of the phase-legs currents (see Kirchhoff's current law).

In a development of the method, a value of the common mode voltage angle $\phi_{uG}^0$ and a value of the common mode voltage amplitude $\hat{u}_G^0$ are calculated by the following equation:

$$\phi_{uG}^0 = a\tan\frac{k_6 k_1 - k_3 k_4}{k_3 k_5 - k_6 k_2}$$

$$\hat{u}_G^0 = \begin{cases} -\dfrac{k_3}{k_1 \cos\phi_{uG}^0 + k_2 \sin\phi_{uG}^0} \\ \text{or} -\dfrac{k_6}{k_4 \cos\phi_{uG}^0 + k_5 \sin\phi_{uG}^0} \end{cases}$$

wherein k1 to k6 are values of a first to a sixth parameter which are calculated as a function of the measured signals. The value of the common mode voltage amplitude is calculated using the equation with the larger denominator.

In a development of the method, in case the converter is set to the static synchronous compensator mode, the mode control signals are generated as a function or combination of the rescaled signals and the common mode voltage signals, with a weighting factor. Thus, the mode control signals are generated as a function of both the rescaled signals and the common mode voltage signals, using a weighting factor.

In a development of the method, in case the converter is set to the grid unbalance mode, the mode control signals are generated as a function of a first and a second circulating current signal or are equal to the first and the second circulating current signal. In an example, the mode control signals are additionally generated as a function of a third and a fourth circulating current or additionally comprise the third and the fourth circulating current signal. The first and the third circulating current signal may be equal; alternatively the first and the third circulating current signal have the same amplitude, but a different phase or angle. The second and the fourth circulating current signal may be equal; alternatively the second and the fourth circulating current signal have the same amplitude, but a different phase or angle.

In a development of the method, a value of a first to a fourth circulating current amplitudes $\hat{i}_{\alpha\alpha}^M, \hat{i}_{\beta\alpha}^M, \hat{i}_{\alpha\beta}^M, \hat{i}_{\beta\beta}^M$ and a value of a first to a fourth circulating current phases $\phi_{\alpha\alpha}, \phi_{\alpha\beta}, \phi_{\beta\alpha}, \phi_{\beta\beta}$ of the first to the fourth circulating current signals are calculated by the following equations:

$$\hat{i}_{\alpha\alpha}^M = \hat{i}_{\alpha\beta}^M = -\frac{\hat{i}_G^{NS} \hat{u}_G^{PS} \cos(\phi_{iG}^{NS} - \phi_{uG}^{PS}) + \hat{i}_G^{PS} \hat{u}_G^{NS} \cos(\phi_{iG}^{PS} - \phi_{uG}^{NS})}{2\hat{u}_M}$$

$$\hat{i}_{\beta\alpha}^M = \hat{i}_{\beta\beta}^M = \frac{\hat{i}_G^{NS} \hat{u}_G^{PS} \sin(\phi_{iG}^{NS} - \phi_{uG}^{PS}) - \hat{i}_G^{PS} \hat{u}_G^{NS} \sin(\phi_{iG}^{PS} - \phi_{uG}^{NS})}{2\hat{u}_M}$$

$$\phi_{\alpha\alpha}^M = \phi_{uM} + \pi$$

$$\phi_{\alpha\beta}^M = \phi_{uM} + 3\pi/2$$

$$\phi_{\beta\alpha}^M = \phi_{uM}$$

$$\phi_{\beta\beta}^M = \phi_{uM} + \pi/2$$

wherein $\hat{i}_G^{NS}$ is a value of a negative-sequence grid current magnitude,
$\hat{u}_G^{PS}$ is a value of a positive-sequence grid voltage magnitude,
$\phi_{iG}^{NS}$ a value of a negative-sequence grid current angle,
$\phi_{uG}^{PS}$ is a value of a positive-sequence grid voltage angle,
$\hat{i}_G^{PS}$ is a value of a positive-sequence grid current magnitude,
$\hat{u}_G^{NS}$ is a value of a negative-sequence grid voltage magnitude,
$\phi_{iG}^{PS}$ is a value of a positive-sequence grid current angle,
$\phi_{uG}^{NS}$ is a value of a negative-sequence grid voltage angle,
$\hat{i}_{\alpha\alpha}^M$ is a value of the first circulating current amplitude,
$\hat{i}_{\alpha\beta}^M$ is a value of the third circulating current amplitude,
$\hat{i}_{\beta\alpha}^M$ is a value of the second circulating current amplitude,
$\hat{i}_{\beta\beta}^M$ is a value of the fourth circulating current amplitude,
$\phi_{\alpha\alpha}^M$ is a value of a first circulating current angle,
$\phi_{\alpha\beta}^M$ is a value of a third circulating current angle,
$\phi_{\beta\alpha}^M$ is a value of a second circulating current angle,
$\phi_{\beta\beta}^M$ is a value of a fourth circulating current angle,
$\phi_{uM}$ is a value of a second side voltage angle (also named machine voltage angle) and
$\hat{u}_M$ is a value of a second side voltage magnitude (also named machine voltage magnitude).

In a further development of the method, the values of the following parameters are transformed from measurements (current and voltage measurements at the converter):
the negative-sequence grid current magnitude $\hat{i}_G^{NS}$,
the positive-sequence grid voltage magnitude $\hat{u}_G^{PS}$,
the negative-sequence grid current angle $\phi_{iG}^{NS}$,
the positive-sequence grid voltage angle $\phi_{uG}^{PS}$,
the positive-sequence grid current magnitude $\hat{i}_G^{PS}$,
the negative-sequence grid voltage magnitude $\hat{u}_G^{NS}$,
the positive-sequence grid current angle $\phi_{iG}^{PS}$, and
the negative-sequence grid voltage angle $\phi_{uG}^{NS}$.

In a development of the method, in case the converter is set to the grid unbalance mode (which means that the converter is e.g. automatically activated into this mode), the mode control signals are generated as a function or combination of
the first and the second circulating current signal and
the rescaled signals and/or the common mode voltage signals,
with a weighting factor. The mode control signals are generated as described above e.g. when there is a mode transition from the second side not energized to the second side energized, e.g., if a machine is connected, then during low speed operation.

Thus, the mode control signals are generated as a function of:

the first and the second circulating current signal and the rescaled signals and/or the common mode voltage signals. Thus, the converter is configured to perform a smooth transition between the different special operating modes.

In a development of the method, the first side of the converter includes a first number L1 of phases and the second side of the converter includes a second number L2 of phases. Thus, the first side of the converter comprises a first number L1 of terminals. The second side of the converter comprises a second number L2 of terminals. In an example, the first and the second number L1, L2 of phases are equal. In an example, the first and the second number L1, L2 of phases are three. In an alternative example, the first number L1 equals three and the second number L2 is larger than three.

In a development of the method, the converter is realized as a direct AC/AC converter.

In a development of the method, each of the number M of phase-legs comprises a number N of cells. The cells are e.g. realized as full bridge cells. Each phase-leg additionally comprises e.g. a phase-leg reactor. The phase-leg reactor and the number N of cells form a series circuit.

The method performs the steps in real-time. Thus, the method operates on-line.

There is provided a converter which comprises a control arrangement and a number M of phase-legs. Each of the number M of phase-legs comprises at least a cell with a capacitor and semiconductor switches. The converter is realized as a modular-multilevel converter, abbreviated MMC. The converter is configured to execute the steps of the method described above.

There is provided a computer program product comprising instructions to cause the converter described above to execute the steps of the method described above. The computer program product realizes e.g. at least one of the modules described in this disclosure.

The converter and the computer program product described above are particularly suitable for the method for operating a converter. Features described in connection with the converter and the computer program product can therefore be used for the method and vice versa.

Advantageously, the converter balances the voltages such as e.g. capacitor voltages and the currents in the phase-legs even in the special operating modes described above.

In a development of the method, the method provides a control of a direct 3-phase/3-phase modular-multilevel converter with no voltage at one end or grid unbalances. Thus, the method provides a control of the converter under abnormal conditions.

In a development, the disclosure relates to the control of a direct 3-phase/3-phase modular-multilevel converter (abbreviated MMC) in special operating modes, where either one terminal has no voltage or grid unbalances. Regarding the first case, such a condition arises in variable-speed pumped hydro storage plants with the machine at standstill and the converter running (optionally) in STATCOM mode on the grid. The special operating modes could also be implemented in a converter-fed synchronous condenser. The second case is much more generic and is linked with the fault ride-through capability of the converter which is defined in grid codes.

In a development, an AC/AC conversion can be performed either with a back-to-back or with a direct frequency converter. The converter may operate with significant input/output frequency difference.

The following description of Figures of examples or embodiments may further illustrate and explain aspects of the converter and the method for voltage conversion. Arrangements, devices and modules with the same structure and the same effect, respectively, appear with equivalent reference symbols. In so far as arrangements, devices and modules correspond to one another in terms of their function in different Figures, the description thereof is not repeated for each of the following Figures.

Figure 1:
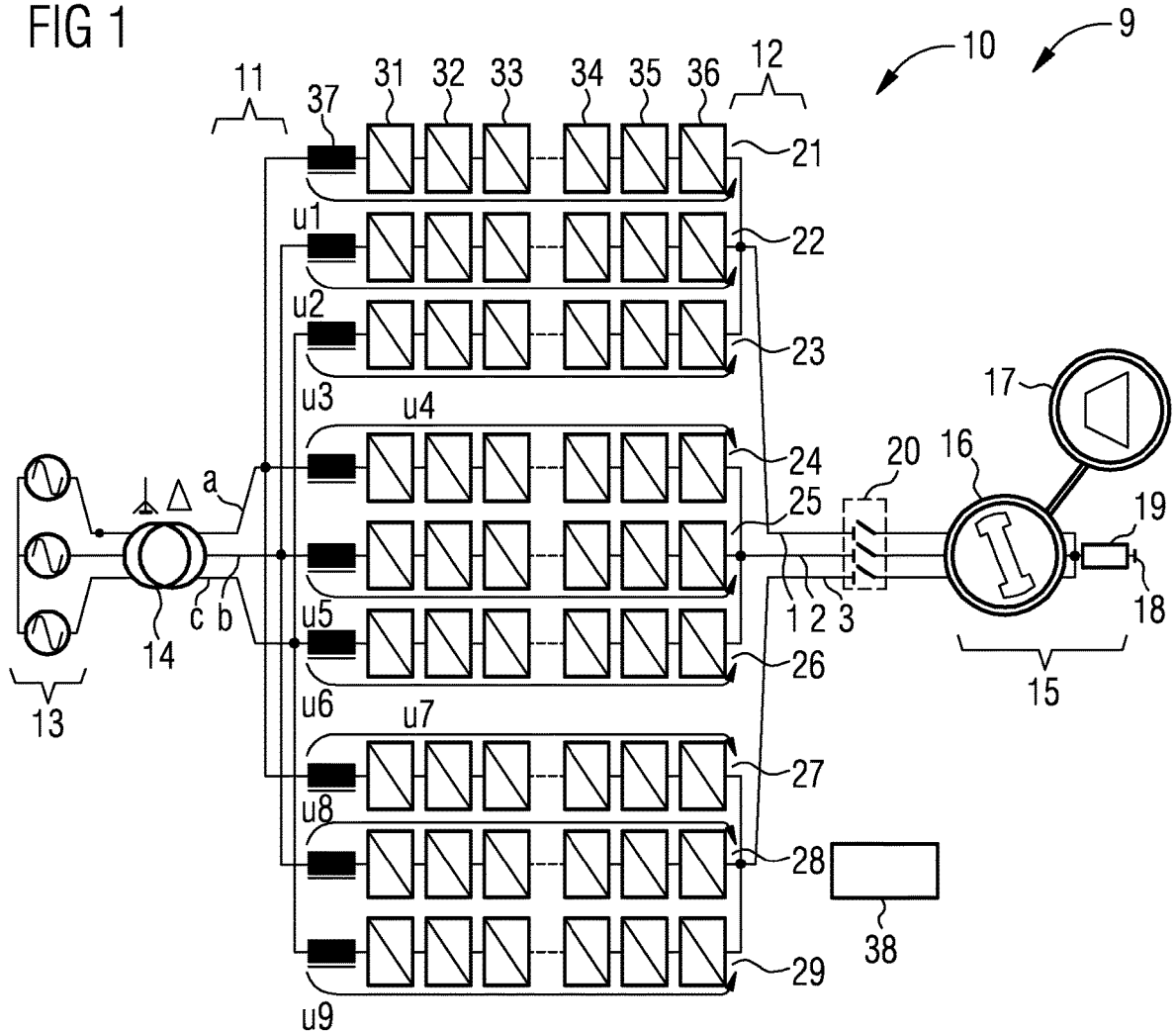
FIGS. 1 and 2 show an exemplary embodiment of a converter and of details of a converter.

FIG. 1 shows an exemplary embodiment of a converter 10 that is realized as an AC/AC converter. The converter 10 is implemented as a direct AC/AC converter. The converter 10 has a first side 11 and a second side 12. The first side 11 includes three terminals a, b, c for three phases. The second side 12 also includes three terminals 1, 2, 3 for three phases. The converter 10 is realized as modular-multilevel converter, abbreviated as MMC. The first side 11 of the converter 10 is coupled to a grid 13. A transformer 14 couples the first side 11 of the converter 10 to the grid 13.

The second side 12 of the converter 10 is coupled to a machine 15. The machine 15 e.g. includes a generator 16 and a turbine 17. The generator 16 and the turbine 17 are mechanically connected to each other via a shaft. A first side of the generator 16 is connected to the second side 12 of the converter 10. Optionally, a machine disconnector 20 couples the first side of the generator 16 to the second side 12 of the converter 10. A second side of the generator 16 is coupled to an earth terminal 18. In impedance 19 may be arranged between the second side of the generator 16 and the earth terminal 18. An arrangement 9 or system comprises the converter 10, the grid 13, the transformer 14 and the machine 15. The converter 11 includes a control arrangement 38 coupled via not-shown connection lines and/or wireless to the phase-legs 21 to 29 and the other parts of the arrangement.

The converter 10 comprises a number M of phase-legs 21 to 29. In FIG. 1, the number M is nine. The phase-legs 21 to 29 can be called "legs", "branches" or "arms". A first to a third phase-leg 21 to 23 couples a first terminal 1 of the second side 12 to a first, second and third terminal a, b, c of the first side 11. Correspondingly, a fourth to a sixth phase-leg 24 to 26 couples a second terminal 2 of the second side 12 to the first, second and third terminal a, b, c of the first side 11. Similarly, a seventh to a ninth phase-leg 27 to 29 couples a third terminal 3 of the second side 12 to the first, second and third terminal a, b, c of the first side 11. The first to the third terminal a, b, c of the first side 11 can be named grid terminals. The first to the third terminal 1, 2, 3 on the second side 12 can be named motor terminals.

Each of the phase-legs 21 to 29 comprises a number N of cells 31 to 36. In the example shown in FIG. 1, the number N is 6. However, the number N may also be 2, 3, 4, 5 or higher than 6. The number N of cells 31 to 36 of a phase-leg are e.g. connected in series. Additionally, each of the phase-legs 21 to 29 comprise a phase-leg reactor 37 that is connected in series to the number N of cells 31 to 36. Each of the phase-legs 21 to 29 has e.g. the same structure as a first phase-leg 21. A first to a ninth phase-leg voltage u1 to u9 can be tapped across the first to the ninth phase-leg 21 to 29. Measured phase-leg capacitor signals $u_{C\Sigma,yxn}$ are typically different from the first to the ninth phase-leg voltage u1 to u9. The phase-leg reactor 37 can be realized as inductor, inductance, coil or impedance.

In an example, the arrangement 9 is configured for a pumped hydro installation with a nominal power of e.g. 80 MW and a variable motor frequency of e.g. around ⅔ of the nominal grid frequency. The machine 15 is realized e.g. as a synchronous machine, which may feature higher flexibility and efficiency compared to a doubly fed induction machine (abbreviated DFIM). CFSM which is the abbreviation for converter fed synchronous machine means a converter is processing the whole power flow from the synchronous machine, as opposed to a DFIG, where the converter is placed to supply the rotor of an asynchronous machine. The configuration of the direct MMC is shown in FIG. 1. The arrangement 9 is implemented as a direct AC/AC MMC with three-phase grid connection on the first side 11 and a synchronous machine 15 on the second side 12, connected with a pump/turbine 17 by a mechanical shaft. The grounding of the converter 10 can possibly be made with the impedance 19 connected to the machine stator midpoint as shown here, but this is not the only option. The impedance 19 may include at least one of a resistor, resistors, inductor and inductors. The impedance 19 may be realized as a resistive and/or an inductive impedance.

The first to third terminal x={a,b,c} on the first side 11 which may be named grids terminals are connected to the first to third terminal y={1,2,3} on the second side 12 which may be named motor terminals via the number M of phase-legs 21 to 29 which can be named branches. Each phase-leg 21 to 29 comprises a string of cells 31 to 36 plus the phase-leg impedance 37. Each cell 31 to 36 is a bipolar cell (full-bridge), since the phase-leg voltages u1 to u9 have a dual frequency ac waveform.

A possible goal of machine standstill is to remain in converter ready state (waiting to start pump or turbine operation) while maintaining the cells 31 to 36 charged, while a goal in STATCOM mode is to provide ancillary services to the three-phase grid 13. Since in an example the arrangement 9 does not have the machine disconnector 20, the arrangement 9 cannot be reduced to three independent Y-STATCOM converters during the operation. For the Y-STATCOM, either negative sequence currents or zero sequence voltage may typically be used to perform the energy balancing control. As the voltage at the machine terminal is zero (for example at one, two or three of the first to the third terminals 1, 2, 3), the degrees of freedom for balancing are strongly limited. If no suitable control action is performed, the average phase-leg capacitor voltages diverge and the robustness against grid faults and the STATCOM operation is compromised due to a reduced margin with respect to the cell over-voltage (abbreviated OV) trip level and/or the cell under-voltage (abbreviated UV) trip level.

The first to third terminal on the first side 11 of the converter 11 (being the grid terminals, namely the terminals on the transformer secondary side) are defined with the index x={a,b,c}. The first to third terminal on the second side 12 (being the machine terminals) are defined with the index y={1,2,3}. The phase-legs indices are [1a,1b,1c,2a,2b,2c,3a,3b,3c]. When one terminal voltage is zero, paralleled phase-legs (1a-2a-3a/1b-2b-3b/1c-2c-3c) can be balanced. For this purpose, a special control method is employed, which is described below. However, balancing different sets of phase-legs (e.g. transferring energy from a↔b, b↔c, c↔a) is not possible.

Figure 2:
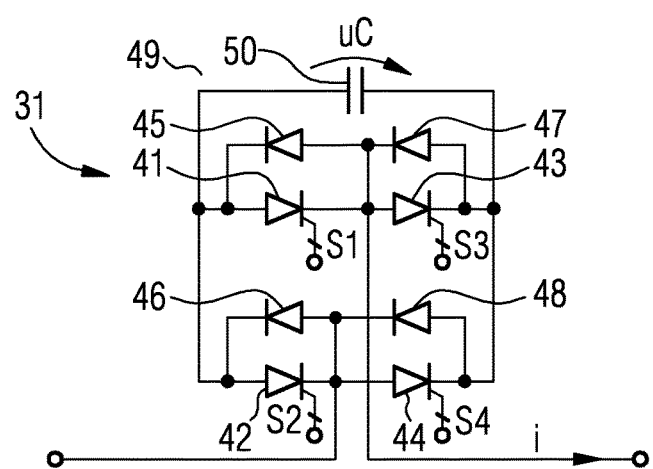

FIG. 2 shows an example of a cell 31 that can be used in the embodiment of the converter 10 shown in FIG. 1. The cell 31 is realized as full bridge cell. In an example, the number N of cells 31 to 36 of the first phase-leg 31 is realized such as the cell 31. The cell 31 comprises four semiconductor switches 41 to 44. In an example, the semiconductor switches 41 to 44 are realized as insulated-gate bipolar transistors (abbreviated IGBTs), integrated gate commutated thyristors (IGCTs), gate turn-off thyristors (abbreviated GTOs) and/or metal-oxide-semiconductor field-effect transistors (abbreviated MOSFETs). The semiconductor switches 41 to 44 are configured to be able to interrupt the current flowing. The cell 31 comprises four diodes 45 to 48 which are coupled to the four semiconductor switches 41 to 44. The four diodes 45 to 48 operate as freewheeling diodes. The four diodes 45 to 48 are connected as anti-parallel diodes to the four semiconductor switches 41 to 44. Thus, for example, the diode 45 is anti-parallel diode to the semiconductor switch 41 etc. The cell 31 includes a storage arrangement 49. The storage arrangement 49 comprises e.g. a capacitor 50. A cell voltage uC (which may be named capacitor voltage) is stored by the storage arrangement 49. Control terminals of the semiconductor switches 41 to 44 are coupled to the control arrangement 38 (shown in FIG. 1A). A phase-leg current i flows through the cell 31. The phase-leg current i might flow through the cell capacitor 50 with the same or opposite sign, or only flows through the semiconductor switches 41 to 44.

In an example, a measured signal is determined by measurements of the current i, the cell voltage uC and/or the first phase-leg voltage u1 by current sensors and/or voltage sensors (not shown).

The cell 31 is realized as bipolar cell, i.e. a voltage across the cell terminals can be +uC,0,−uC. In an example, the cell 31 could provide more than three voltage levels (e.g. +uC,+uC/2,0,−uC/2,−uC).

In order to modify on the converter energy balance by shifting energy from one phase-leg 21 to 29 to another phase-leg, internal currents (commonly named circulating currents) which are neither visible at the terminals of the grid 13 nor the terminals of the machine 15, shall be used. Mathematically speaking, that is not the only option:
- circulating currents interact with terminal voltages (determined for a given energy transfer) and create dc (plus ac harmonics of less relevance since zero mean) power components if they have the same frequency used to make an energy transfer between phase-legs (reduce energy stored in cell capacitors in one or more phase-legs and increase energy stored in cell capacitors in one or more phase-legs).
- common mode voltage interacts with terminal currents (determined for a given energy transfer) and create dc (plus ac harmonics of less relevance since zero mean) power components if they have the same frequency used to make an energy transfer between phase-legs (reduce energy stored in cell capacitors in one or more phase-legs and increase energy stored in cell capacitors in one or more phase-legs).

If the topology does not allow for circulating currents, e.g. a Y-STATCOM, other means are required, such as common mode voltage (if terminal currents are sufficiently large) or manipulating the terminal currents otherwise.

Figure 3:
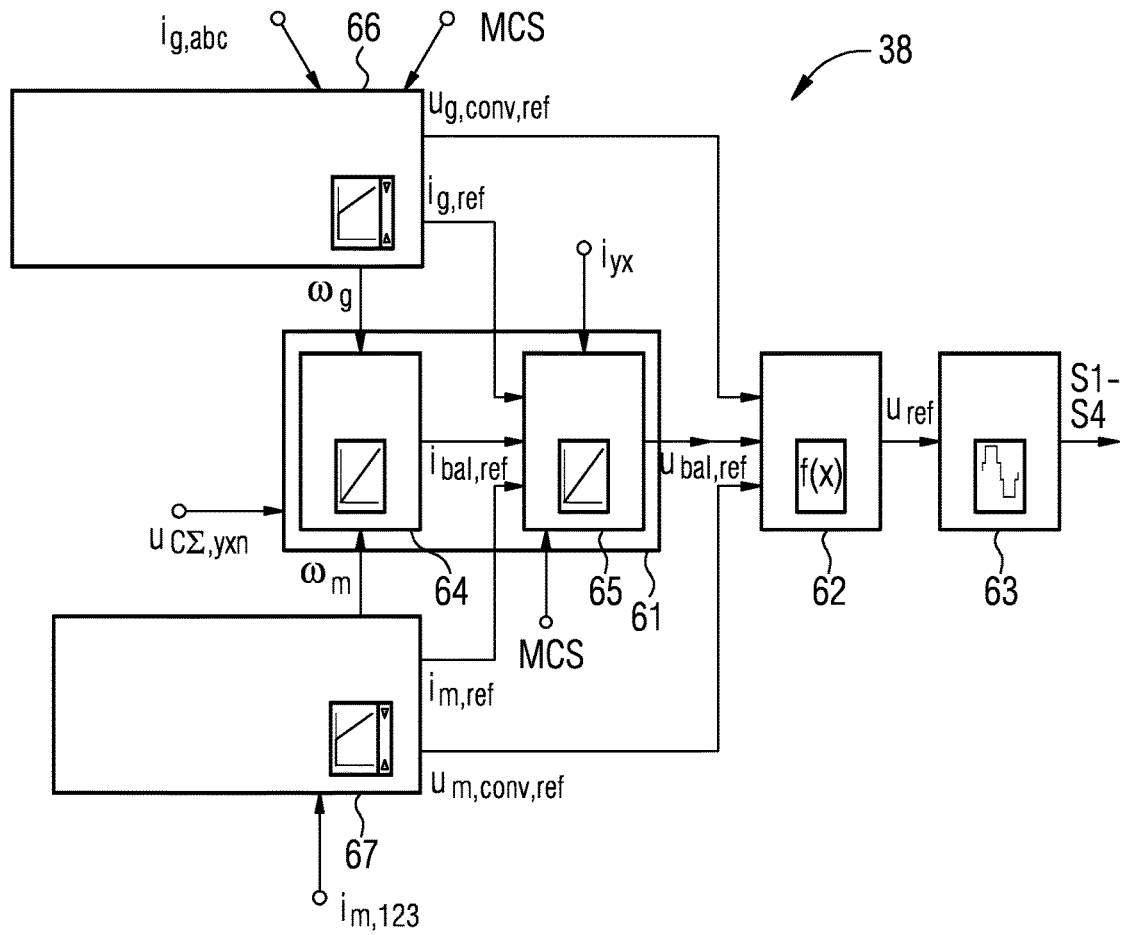
FIGS. 3 to 5 show an exemplary embodiment of a control arrangement of a converter and details of a control arrangement.
Figure 4:
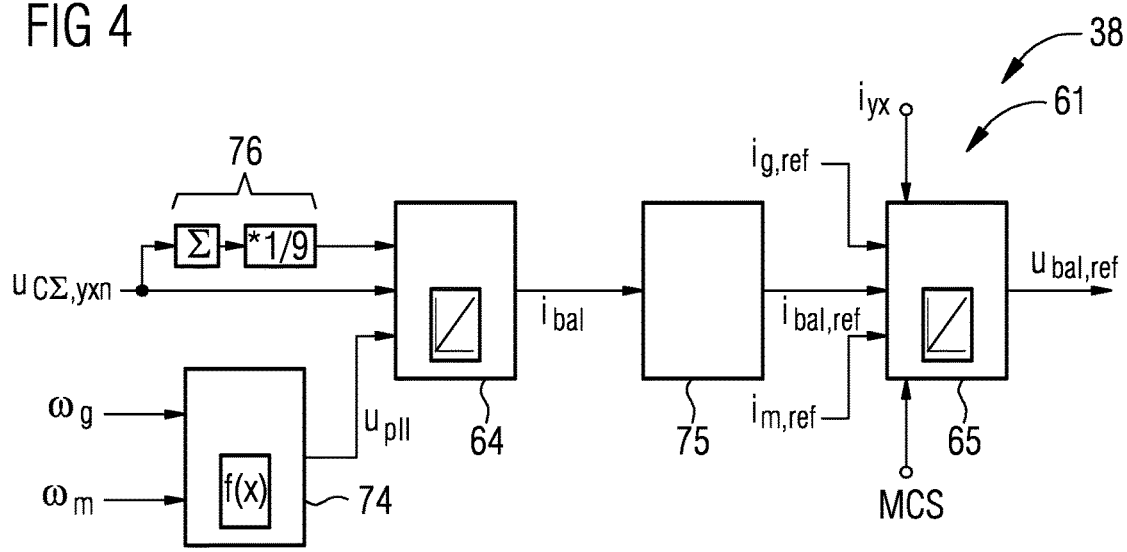

The balancing control for a wide class of MMCs is presented in FIG. 3. The control can be divided into subcategories or modules as illustrated in FIGS. 3 and 4. The control concept for the energy balancing at machine standstill and other modes shown in FIGS. 5 to 9 extends the concepts shown in FIGS. 3 and 4.

FIG. 3 shows an exemplary embodiment of a control arrangement 38 of a converter 10 which is a further development of the embodiments shown above. In FIG. 3, control of a direct 3-phase/3-phase MMC for a pumped-storage hydro power plant is elucidated, wherein an inner control module 61 is realized e.g. according to FIG. 4.

The control arrangement 38 at least realizes the following modules: The inner control module 61 is coupled to an input side of a reference generator 62. The reference generator 62 is coupled to an input side of a modulator 63. The inner control module 61 includes a voltage control module 64 and a current control module 65. An output of the voltage control module 64 is coupled to an input of the current control module 65. The output of the current control module 65 is coupled to the input side of the reference generator 62.

A first side control module 66 is coupled on its output side to the inner control module 61 and the reference generator 62. More specifically, the first side control module 66 is coupled to the voltage control module 64 and to the current control module 65. The first side control module 66 can also be named grid control module or grid side current controller.

Correspondingly, a second side control module 67 is coupled on its output side to the inner control module 61 and the reference generator 62. More specifically, the second side control module 67 is coupled to the voltage control module 64 and to the current control module 65. The second side control module 66 can also be named machine control module or machine current controller.

The modulator 63 generates cell control signals S1 to S4 for the number M of phase-legs 21 to 29 as a function of phase-leg control signals $u_{ref}$. More specifically, different cell control signals S1 to S4 are provided to the semiconductor switches 41 to 44 of each cell of the number N of cells 31 to 36 of each phase-leg of the number M of phase-legs 21 to 29. The reference generator 62 generates the phase-leg control signals $u_{ref}$ for each phase-leg of the number M of phase-legs 21 to 29 as a function of first side voltage reference signals $u_{g,conv,ref}$, second side voltage reference signals $u_{m,conv,ref}$ and balance voltage reference signals $u_{bal,ref}$.

Mode control signals MCS are provided to the first side control module 66 and/or to the inner control module 61, especially to the current control module 65 of the inner control module 61. Thus, in FIG. 3, the mode control signals MCS are shown twice, indicating the possible modules to which the mode control signals MCS can be applied in the different examples.

Thus, in an example, the mode control signals MCS are provided to the first side control module 66.

The current control module 65 generates the balance voltage reference signals $u_{bal,ref}$ as a function of first side current reference signals $i_{g,ref}$, second side current reference signals $i_{m,ref}$ and current balance reference signals $i_{bal,ref}$ or current balance signals $i_{bal}$. Phase-leg measured current signals $i_{yx}$ are provided to the current control module 65. Phase-leg measured current signals $i_{yx}$ represent currents in each of the nine phase-legs 21 to 29. The current control module 65 generates the balance voltage reference signals $u_{bal,ref}$ as a function of a comparison of—on one hand—the phase-leg measured current signals $i_{yx}$ and—on the other hand—of a signal gained from the first side current reference signals $i_{g,ref}$, the second side current reference signals $i_{m,ref}$ and the current balance reference signals $i_{bal,ref}$ or current balance signals $i_{bal}$.

The voltage control module 64 generates the current balance reference signals $i_{bal,ref}$ or the current balance signals $i_{bal}$ as a function of a first side frequency $\omega_g$, a second side frequency $\omega_m$ and measured phase-leg capacitor signals $u_{C\Sigma,yxn}$.

The first side control module 66 provides the first side current reference signals $i_{g,ref}$ depending on the mode control signals MCS and first side measured current signals $i_{g,abc}$. The first side measured current signals $i_{g,abc}$ are measured e.g. at the first to the third terminal a, b, c of the first side 11. Furthermore, the first side control module 66 provides the first side frequency $\omega_g$ and the first side voltage reference signals $u_{g,conv,ref}$ for example depending on the mode control signals MCS and/or the first side measured current signals $i_{g,abc}$.

Thus, the mode control signals MCS is an input for the grid side control (negative-sequence currents). The first side control module 66 includes e.g. controllers with an integrator (e.g. PI controllers for proportional-integral or PR controllers for proportional-resonant). The mode control signals MCS are part of the first side current reference signals $i_{g,ref}$; so there is no need for an additional input of the mode control signals MCS to the current control module 65. In case the mode control signals MCS would alternatively be applied to the current control module 65 and the current control module 65 would include proportional controllers, the mode control signals MCS would be erased.

The second side control module 67 provides the second side frequency $\omega_m$, the second side current reference signals $i_{m,ref}$ and the second side voltage reference signals $u_{m,cov,ref}$ for example depending on a second side reference frequency $\omega_{m,ref}$. The power control could be assigned to either of the first and/or the second side. The second side control module 67 receives second side measured current signals $i_{m,123}$ which are measured at the first to the third terminal 1, 2, 3 of the second side 12 of the converter 11. Typical speed or power controls are applied. If one side performs the power control, then the opposite side performs the energy stored control. For example, the first side control module 66 or the second side control module 67 adjusts the energy stored inside the capacitor 50 of the cells 31 to 36. A value $W_C$ of the energy can be calculated using the equation:

$$W_C = \frac{1}{2} C_{cell} \sum_{y,x,n} u_{C,yxn}^2$$

with $C_{cell}$ is a capacitance value of the capacitor 50 in one of the full-bridge cells 31 to 36, $u_{Cxyn}$ is a value of a capacitor voltage (which is equal to the cell voltage uC), x is a value of a terminal on the first side 11 (x is 1, 2 or 3), y is a value of a terminal at the second side (y is 1, 2 or 3) and n is a number of the phase-leg (n={1, . . . M}).

The control arrangement 38 may comprise one or more than one microprocessor or microcontroller. The control arrangement 38 may include one or more than one field-programmable gate array, abbreviated FPGA. For example, the inner control module 61 and the reference generator 62 may be implemented by a microcontroller or microprocessor. The modulator 63 may be realized by a microcontroller, microprocessor, FPGA or an analog circuit. The modulator 63 is configured to generate a pulse pattern. Thus, the modules of the control arrangement 38 (shown in FIGS. 3 to 5, 6, 8A, 8C and 8D etc.) are realized by at least one microcontroller or microprocessor using a computer program or several software parts forming the computer program and/or are realized by hardware performing logical operations and/or analog signal processing steps.

The measurements of the cell voltage uC, other voltages, currents and other signals are performed by current sensors, voltage sensors and other sensors (not shown), e.g. used in the field of power conversion systems. The sensors couple the terminals at the first and the second side 11, 12 and the phase-legs 21 to 29 to the control arrangement 38.

In an alternative embodiment, not shown, the current control module 65 generates the balance voltage reference signals $u_{bal,ref}$ as a function of first side current reference signals $i_{g,ref}$, second side current reference signals $i_{m,ref}$, mode control signals MCS and current balance reference signals $i_{bal,ref}$ or current balance signals $i_{bal}$.

FIG. 4 shows an exemplary embodiment of details of a control arrangement 38 of the converter 10 which is a further development of the embodiments shown above. In FIG. 4, an example of the inner control module 61 of a direct ac/ac MMC is explained. A signal generator 74 provides clock signals $u_{pll}$ as a function of the first side frequency $\omega_g$ and the second side frequency $\omega_m$. The signal generator 74 takes as input the frequency information $\omega_g$ and $\omega_m$, e.g. already retrieved by a phase-locked loop, a power synchronization loop or another algorithm retrieving the frequency information in the grid and machine side modules. The inner control module 61 comprises a decoupling matrix module 75 that couples the voltage control module 64 to an input side of the current control module 65. The voltage control module 64 receives measured signals. The measured signals are the measured phase-leg capacitor signals $u_{C\Sigma,yxn}$. The measured phase-leg capacitor signals $u_{C\Sigma,yxn}$ represent a number M of average capacitor voltages or a number M of signals representing average capacitor voltages. The measured phase-leg capacitor signals $u_{C\Sigma,yxn}$ depend on the average of the cell voltages uC of a phase-leg of the number M of phase-legs 21 to 29. Moreover, the voltage control module 64 also receives the measured phase-leg capacitor signals $u_{C\Sigma,yxn}$ representing an average of the first number M of average capacitor voltages. An averaging module 76 of the inner control module 61 generates the average of the first number M of the measured phase-leg capacitor signals $u_{C\Sigma,yxn}$.

The inner control module 61 includes a cascaded average capacitor voltage/phase-leg current control. The decoupling matrix module 75 with a symbol Kdec or $\mathbb{K}_{dec}$ is configured to avoid modifying the grid and motor currents while balancing the cells, i.e. the current balance reference signal $i_{bal,ref}$ are internal (circulating) currents.

Figure 5:
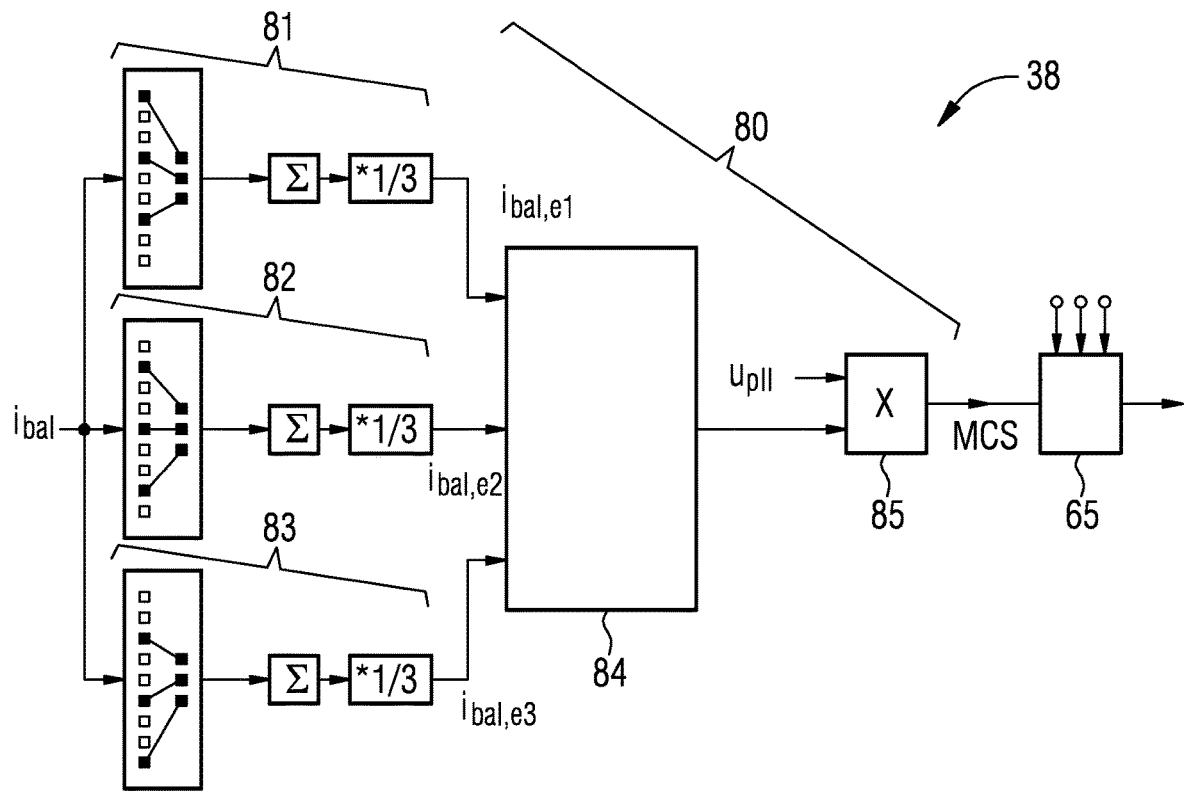

FIG. 5 shows an exemplary embodiment of details of a control arrangement 38 which is a further development of the embodiments shown in FIGS. 1 to 4. In FIG. 5, a first method is described which uses negative sequence grid currents. The method can be used in one of the following cases: The machine 15 has a standstill, the converter 10 is in a standby mode with machine standstill and/or the converter 10 is in STATCOM mode with machine standstill. In these cases, the machine control module 67 is inactive ($u_{ref}^{INU}$=0 and $i_{ref}^{INU}$=0). The balancing control loses some degrees of freedom (coming from the machine terminals 1, 2, 3) and an alternate method should be employed in order to continue operation without diverging cell voltages uC, if no additional measure is taken. Principle wise, it is not anymore possible to balance the converter 10 with "circulating" currents. Some (barely noticeable) currents should be allowed to flow on the first side 11 (named grid side), as shown in FIG. 5. Since these currents are not internal, the output is routed to the first side control module 66 (named grid-side current controller). In fact, mainly negative sequence currents are used for balancing. Note that the clock signals $u_{PLL}$ only contain the first side frequency $\omega_g$ (named grid frequency). In FIG. 5, a modification to the balancing control to enable a stable operation in machine standstill and STATCOM modes is shown.

These balancing currents are routed to the first side control module 66, since PI controllers (which are controllers using an integrator part) are used and would cancel out any additional contribution that is not present in their references. Using the method, the measured phase-leg capacitor signals $u_{C\Sigma,yxn}$ are not diverging, demonstrating the effectiveness of the proposed balancing control method.

The control arrangement 38 comprises a rescale module 80 which is coupled to the input side of the current control module 65. The rescale module 80 includes an amplification limitation module 84 and a multiplication module 85 that is arranged between the amplification limitation module 84 and the input side of the current control module 65. The rescale module 80 comprises a first, second and third evaluating module 81 to 83 connected to an input side of the amplification limitation module 84. The input side of the first, second and third evaluating module 81 to 83 are coupled to the number M of phase-legs 21 to 29, e.g. to a number M of current sensors of the number M of phase-legs 21 to 29.

In case the converter 10 is set to the static synchronous compensator mode (abbreviated STATCOM mode), a number M of current balance signals $i_{bal}$ are applied to the first, second and third evaluating module 81 to 83. The converter 10 is set by automatically switching over to the STATCOM mode. A first evaluated current balance signal $i_{bal,e1}$ is generated by the first evaluating module 81 depending on a first, fourth and seventh current balance signal $i_{bal}$, e.g. by averaging these three signals. A second evaluated current balance signal $i_{bal,e2}$ is generated by the second evaluating module 82 depending on a second, fifth and eighth current balance signal $i_{bal}$, e.g. by averaging these three signals. A third evaluated current balance signal $i_{bal,e3}$ is generated by the third evaluating module 83 depending on a third, sixth and ninth current balance signal $i_{bal}$, e.g. by averaging these three signals. The first, second and third evaluated current balance signal $i_{bal,e1}$, $i_{bal,e2}$, $i_{bal,e3}$ are modified by the amplification limitation module 84. The multiplication module 85 multiplies signals provided by the amplification limitation module 84 with the clock signals $u_{pll}$. Output signals of the multiplication module 85 are rescaled signals which are fed to the current control module 65. The mode control signals MCS are realized as the rescaled signals.

Figure 6:
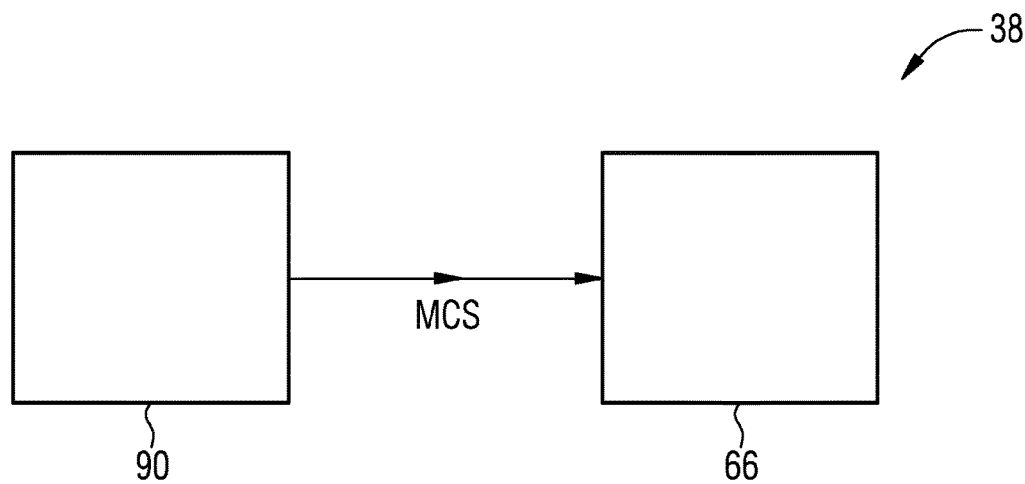
FIGS. 6 and 7 show exemplary embodiments of a control arrangement of a converter and of signals of a converter.

FIG. 6 shows an exemplary embodiment of details of a control arrangement 38 of a converter 10 which is a further development of the embodiments shown above. In FIG. 6, a second method is described which uses a zero sequence common mode voltage injection. The method can be used in one of the following cases: The machine 15 has a standstill, the converter 10 is in a standby mode with machine standstill and/or the converter 10 is in STATCOM mode with machine standstill.

An alternative to the use of negative sequence grid currents (as shown in FIG. 5) is the use of a zero sequence common mode voltage. When the machine 15 is at standstill, there is a significant voltage reserve (about 50%) in the cells 31 to 36 (a cell can be named valve).

The control arrangement 38 comprises a processing module 90 that is coupled on its output side to the first side control module 66 and, thus, indirectly to the current control module 65. The processing module 90 provides the mode control signals MCS to the first side control module 66. The mode control signals MCS are generated as a function of common mode voltage signals. A signal generator of the control arrangement 38 e.g. assembles the magnitude and angle with the first side frequency co g (named grid frequency) for generating the mode control signals MCS. The signal generator may use equations similar to equations (6.1)-(6.4) below. The common mode voltage signals comprises a common mode voltage amplitude $\hat{u}_G^0$ and a common mode voltage angle $\phi_{uG}^0$. The common mode voltage amplitude $\hat{u}_G^0$ and the common mode voltage angle $\phi_{uG}^0$ are generated by the processing module 90 as a function of measured signals, as described below. The measured current and voltage signals are transformed into positive sequence signals and the negative sequence signals. The common mode voltage amplitude $\hat{u}_G^0$ and the common mode voltage angle $\phi_{uG}^0$ are a function of the amplitudes and of the angles (phase angles) of the positive sequence signals and the negative sequence signals.

Alternatively, the mode control signals MCS are equal to the common mode voltage signals which comprise the common mode voltage amplitude $\hat{u}_G^0$ and the common mode voltage angle $\phi_{uG}^0$.

Phases and amplitudes of positive sequence signals and of negative sequence signals are determined using measured current and voltage signals by the processing module 90. The common mode voltage amplitude $\hat{u}_G^0$ and the common mode voltage angle $\phi_{uG}^0$ are determined using the phases and the amplitudes of the positive sequence signals and of the negative sequence signals by the processing module 90.

A thorough mathematical derivation based on the power equations lead to the desired common mode voltage expressions. For sake of brevity, only the results are presented in this document.

$$\frac{4}{\sqrt{2}} p_{\alpha 0} = -\hat{i}_G^{NS} \hat{u}_G^0 \cos(\phi_{iG}^{NS} - \phi_{uG}^0) - \hat{i}_G^{NS} \hat{u}_G^{PS} \cos(\phi_{iG}^{NS} - \phi_{uG}^{PS}) - \quad (1.0)$$
$$\hat{i}_G^{PS} \hat{u}_G^0 \cos(\phi_{iG}^{PS} - \phi_{uG}^0) - \hat{i}_G^{PS} \hat{u}_G^{NS} \cos(\phi_{iG}^{PS} - \phi_{uG}^{NS})$$

$$\frac{4}{\sqrt{2}} p_{\beta 0} = \hat{i}_G^{NS} \hat{u}_G^0 \sin(\phi_{iG}^{NS} - \phi_{uG}^0) - \hat{i}_G^{NS} \hat{u}_G^{PS} \sin(\phi_{iG}^{NS} - \phi_{uG}^{PS}) - \quad (2.0)$$
$$\hat{i}_G^{PS} \hat{u}_G^0 \sin(\phi_{iG}^{PS} - \phi_{uG}^0) - \hat{i}_G^{PS} \hat{u}_G^{NS} \sin(\phi_{iG}^{PS} - \phi_{uG}^{NS})$$

Note that the same solution can be found using complex analysis in abc frame starting with p= $\Re\{\underline{vi}^*\}$.

Figure 7:
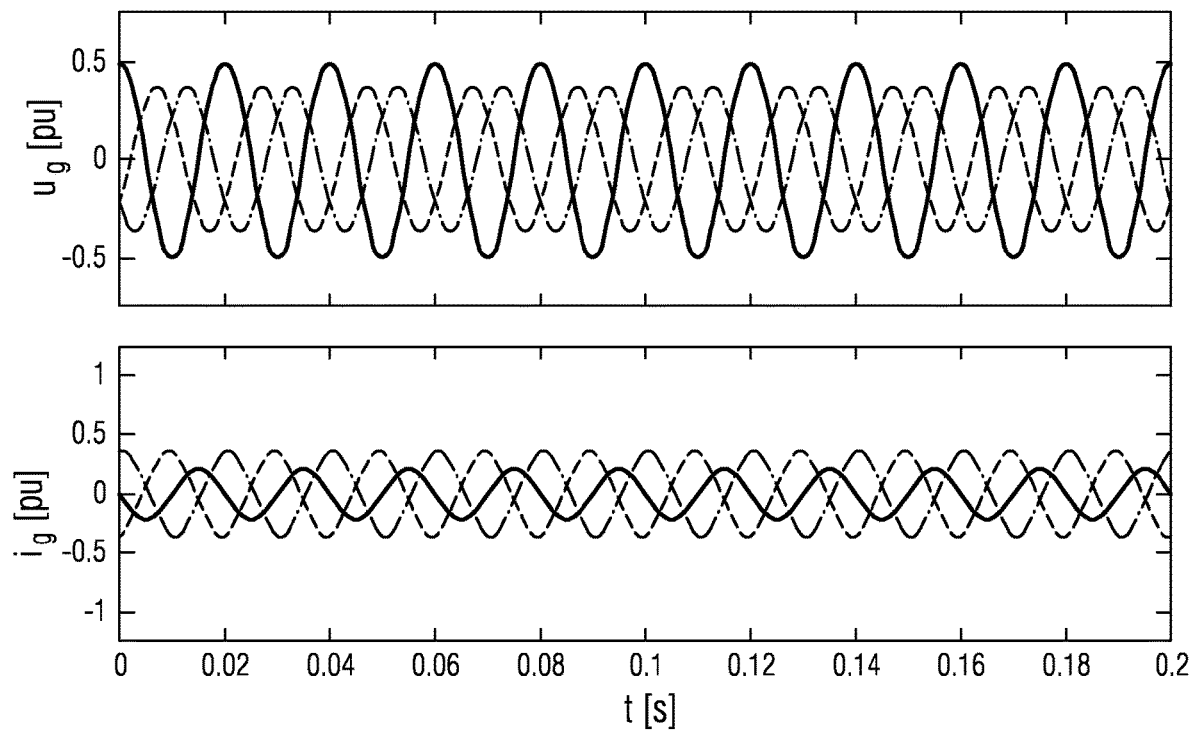

FIG. 7 show exemplary embodiments of voltage and current signals of a converter 10 using the processing module 90 and the method described above, e.g. by FIG. 6. In FIG. 7, voltages $u_g$ and currents $i_g$ at the first, second and third terminal a, b, c of the first side 11 of the converter 10 are shown. FIG. 7 illustrates the second method that can be used in case of machine standstill operation in standby condition when an asymmetrical grid fault occur ($|\underline{u}_+|=0.1$pu and $|\underline{u}_-|=0.4$pu), leading to a reactive current injection of $|\underline{i}_+|=0.3$pu and $|\underline{i}_-|=0.1$pu. The algorithm defines $|\underline{u}_0|=0.325$pu and $\angle \underline{u}_0=\pi$.

Remark: The case where $|\underline{i}_+|=|\underline{i}_-|$ cannot be balanced.

Figure 8A:
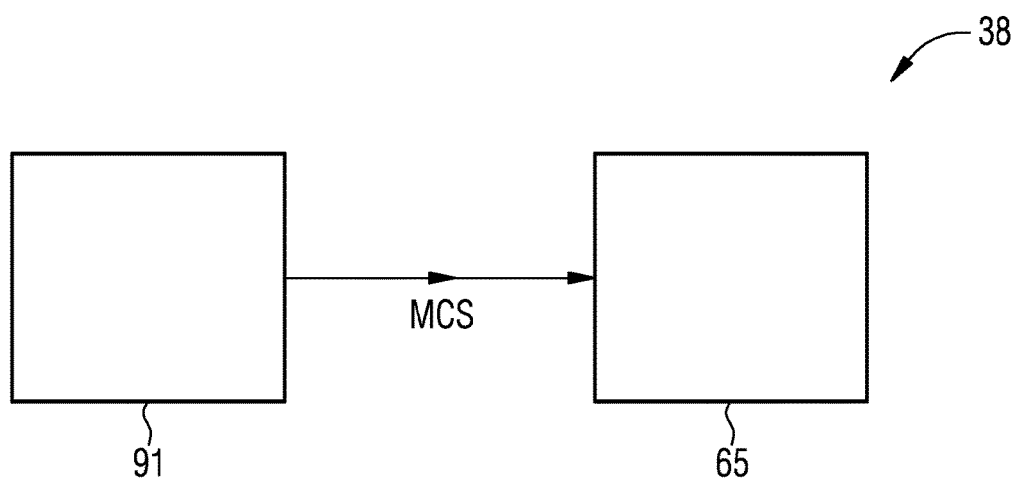
FIGS. 8A to 8D, 9A and 9B show exemplary embodiments of details of a control arrangement of a converter and of signals.

FIG. 8A shows an exemplary embodiment of details of a control arrangement 38 of a converter 10 which is a further development of the embodiments shown above. In FIG. 8A, a third method is described which uses a circulating current injection. The method can be used in the following case: The machine 15 is spinning and the converter 10 should react on grid faults and/or unbalances.

The control arrangement 38 comprises a processing module 91 that is coupled on its output side to the inner control module 61. The processing module 91 provides the mode control signals MCS to the inner control module 61. More specifically, the processing module 91 applies the mode control signals MCS to the current control module 65. The mode control signals MCS are generated as a function of a first circulating current signal and a second circulating current signal as will be explained below.

This method improves the energy balancing during grid faults and unbalances. Due to the existence of negative sequence currents and/or voltages, the terminal powers are not anymore identical, meaning that the energy balance in the phase-legs 21 to 29 are differently affected.

The method is performed for ensuring the phase-leg power matching during grid unbalances. The method is based on a current redistribution between phase-legs connected to the same power terminal on the second side 12, namely the terminals 1, 2, 3. This can be formulated as:

$$i_{yx} = -\frac{p_{My}}{\underbrace{\sum_{k_G} p_{Mi}}_{k_G}} i_G + \frac{p_{Gx}}{\underbrace{\sum_{k_M} p_{Gk}}_{k_M}} i_M \quad (3.0)$$

In normal conditions, i.e., when both three-phase systems are balanced, $k_G=k_M=1/3$. However, the method cannot be applied when $\Sigma p_{Mi}=0$ or $\Sigma p_{Gk}=0$. This latter case is very likely to happen with voltage dips below 0.5 pu, owing that the grid codes indicate a coefficient $k_q=2$ for the reactive current injection during faults ($i_{qRef}=k_q\Delta u$), meaning that all the available current is used for reactive power. The unit pu is an expression of system quantities as fractions of a defined base unit quantity which is often used in the power systems analysis field of electrical engineering (the so-called per-unit system).

A rework of the equation (3.0) enabling its application, when the denominator of either $k_G$ or $k_M$ becomes zero, is the following:

$$\Delta p_{Gk} = p_{Gk} - \frac{\sum p_G}{3} \rightarrow k_M = \frac{1}{3} + \frac{\Delta p_{Gk}}{p_{G,nom}}, \sum \Delta p_{Gk} = 0 \quad (4.0)$$

$$\Delta p_{Mi} = p_{Mi} - \frac{\sum p_M}{3} \rightarrow k_G = \frac{1}{3} + \frac{\Delta p_{Mi}}{p_{M,nom}}, \sum \Delta p_{Mi} = 0$$

The equations use the following parameters:
$\Delta p_{Gk}$: active power difference for phase k on the first side 11,
$p_{Gk}$: active power for phase k on the first side 11,
k: phase on the first side (a,b,c),
$\Sigma p_G/3$: active power average on the first side 11 ($=\Sigma_k p_{Gk}/3$),
$p_{G,nom}$: nominal power for the first side 11 (used for normalization in per-unit system),
$\Delta p_{Mi}$: active power difference for phase i on the second side 12,
$p_{Mi}$: active power for phase i on the second side 12,
i: phase on the first side (1,2,3),
$\Sigma p_M/3$: active power average on the second side 12 ($=\Sigma_i p_{Mi}/3$),
$p_{M,nom}$: nominal power for the second side 12 (used for normalization in per-unit system).

The first side 11 of the converter 10 is the grid side of the converter. The second side 12 of the converter 10 is the machine side of the converter or a further grid side. Instead of having $k_G$ and $k_M$ directly expressed in function of the phase to sum of powers ratio, it is expressed in terms of deviation of the phase power difference with respect to the mean value 1/3.

Figure 8B:
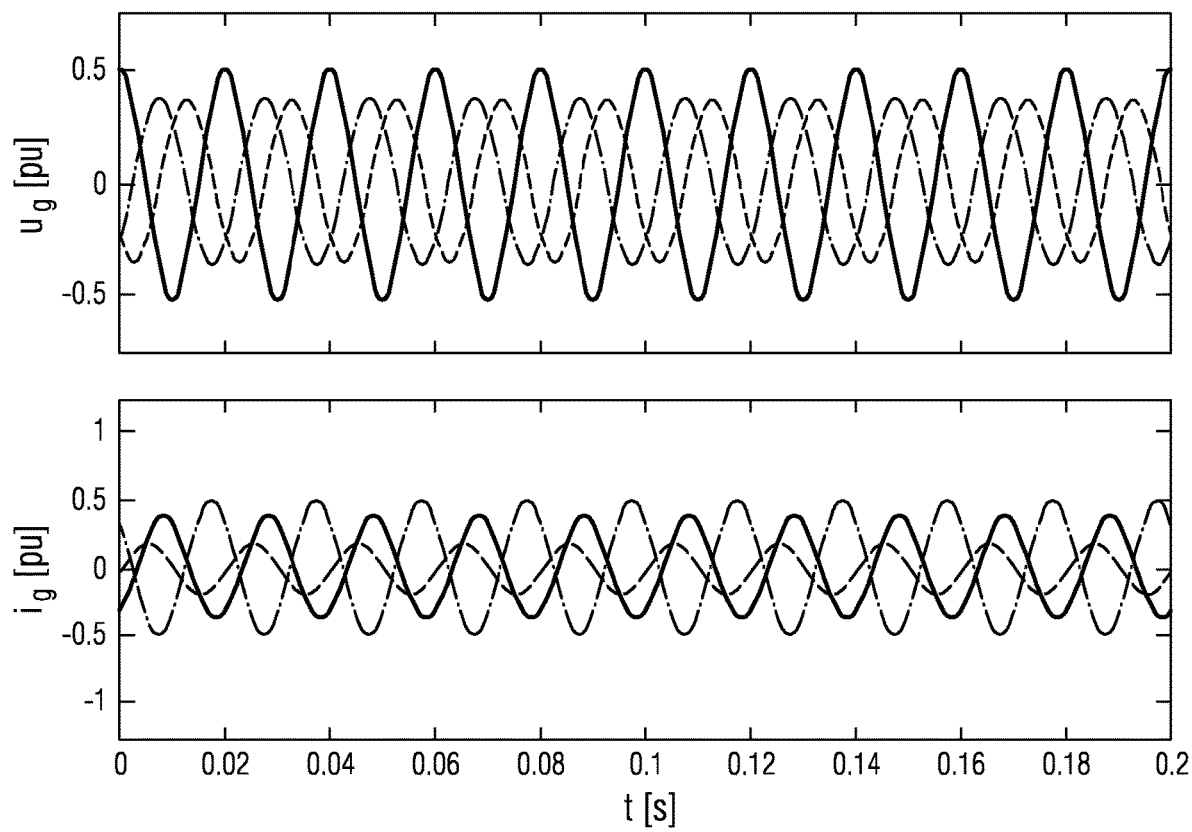

FIG. 8B shows exemplary embodiments of voltage and current signals of a converter 10 as described above, e.g. in FIG. 8A. In FIG. 8B, voltages $u_g$ and currents $i_g$ at the first, second and third terminal a, b, c of the first side 11 of the converter 10 are shown. The FIG. 8B illustrate the third method with grid unbalance. The coefficient $k_G$=[0.415 0.481 0.104] are used in order to achieve input/output phase-leg power matching.

Alternatively, a circulating current with the first side frequency $\omega_g$ (grid frequency) or the second side frequency $\omega_m$ (machine frequency) can be derived in order to match the phase-leg currents obtained e.g. with (4.0). In this case, the set of equations is:

$$p_{\alpha\alpha} = -\frac{\hat{i}_{\alpha\alpha}^M \hat{u}_M \cos(\phi_{\alpha\alpha}^M - \phi_{uM})}{4} - \frac{\hat{i}_{\alpha\beta}^M \hat{u}_M \sin(\phi_{\alpha\beta}^M - \phi_{uM})}{4} \quad (5.0)$$

$$p_{\alpha\beta} = -\frac{\hat{i}_{\alpha\alpha}^M \hat{u}_M \sin(\phi_{\alpha\alpha}^M - \phi_{uM})}{4} + \frac{\hat{i}_{\alpha\beta}^M \hat{u}_M \cos(\phi_{\alpha\beta}^M - \phi_{uM})}{4}$$

$$p_{\beta\alpha} = -\frac{\hat{i}_{\beta\alpha}^M \hat{u}_M \cos(\phi_{\beta\alpha}^M - \phi_{uM})}{4} - \frac{\hat{i}_{\beta\beta}^M \hat{u}_M \sin(\phi_{\beta\beta}^M - \phi_{uM})}{4}$$

$$p_{\beta\beta} = -\frac{\hat{i}_{\beta\alpha}^M \hat{u}_M \sin(\phi_{\beta\alpha}^M - \phi_{uM})}{4} + \frac{\hat{i}_{\beta\beta}^M \hat{u}_M \cos(\phi_{\beta\beta}^M - \phi_{uM})}{4}$$

$$\frac{4}{\sqrt{2}} p_{\alpha 0} = -\hat{i}_G^{NS} \hat{u}_G^{PS} \cos(\phi_{iG}^{NS} - \phi_{uG}^{PS}) -$$

$$\hat{i}_G^{PS} \hat{u}_G^{NS} \cos(\phi_{iG}^{PS} - \phi_{uG}^{NS}) - \hat{i}_{\alpha\alpha}^M \hat{u}_M \cos(\phi_{\alpha\alpha}^M - \phi_{uM}) - \hat{i}_{\alpha\beta}^M \hat{u}_M \sin(\phi_{\alpha\beta}^M - \phi_{uM})$$

$$\frac{4}{\sqrt{2}} p_{\beta 0} = -\hat{i}_G^{NS} \hat{u}_G^{PS} \sin(\phi_{iG}^{NS} - \phi_{uG}^{PS}) -$$

$$\hat{i}_G^{PS} \hat{u}_G^{NS} \sin(\phi_{iG}^{PS} - \phi_{uG}^{NS}) - \hat{i}_{\beta\alpha}^M \hat{u}_M \cos(\phi_{\beta\alpha}^M - \phi_{uM}) - \hat{i}_{\beta\beta}^M \hat{u}_M \sin(\phi_{\beta\beta}^M - \phi_{uM})$$

The circulating currents shall not affect the power transfer, i.e. $p_{\alpha 0}$ and $p_{\beta 0}$ shall remain unmodified.

The circulating currents with the amplitudes $i_{\alpha\alpha}$, $i_{\alpha\beta}$, $i_{\beta\alpha}$, $i_{\beta\beta}$ and angles are defined such that they can interact with the machine voltages.

The mode control signals MCS are equal to the first circulating current signal (more specifically equal to the first circulating current amplitude $\hat{i}_{\alpha\alpha}^M$ and the first circulating current angle $\phi_{\alpha\alpha}^M$) and the second circulating current signal (more specifically equal to the second circulating current amplitude $\hat{i}_{\beta\alpha}^M$ and the second circulating current angle $\phi_{\beta\alpha}^M$) or are generated as a function of the first circulating current signal (more specifically as a function of the first circulating current amplitude $\hat{i}_{\alpha\alpha}^M$ and the first circulating current angle $\phi_{\alpha\alpha}^M$) and the second circulating current signal (more specifically as a function of the second circulating current amplitude $\hat{i}_{\beta\alpha}^M$ and the second circulating current angle $\phi_{\beta\alpha}^M$). The mode control signals are generated as a function of the first and second circulating current signal by a signal generator of the control arrangement 38.

The generation of the time-domain signals for the circulating currents follows the equations (6.1)-(6.4):

$$i_{\alpha\alpha}(t) = \hat{i}_{\alpha\alpha}^M \cos(\omega_M t + \phi_{\alpha\alpha}^M) \quad (6.1)$$

$$i_{\alpha\beta}(t) = \hat{i}_{\alpha\beta}^M \cos(\omega_M t + \phi_{\alpha\beta}^M) \quad (6.2)$$

$$i_{\beta\alpha}(t) = \hat{i}_{\beta\alpha}^M \cos(\omega_M t + \phi_{\beta\alpha}^M) \quad (6.3)$$

$$i_{\beta\beta}(t) = \hat{i}_{\beta\beta}^M \cos(\omega_M t + \phi_{\beta\beta}^M) \quad (6.4)$$

The time-domain signals are reconstructed with the magnitudes and angles $\hat{i}_{\alpha\alpha}^M$, $\phi_{\alpha\alpha}^M$, $\hat{i}_{\alpha\beta}^M$, $\phi_{\alpha\beta}^M$, $\hat{i}_{\beta\alpha}^M$, $\phi_{\beta\alpha}^M$, $\hat{i}_{\beta\beta}^M$, $\phi_{\beta\beta}^M$ and the frequency $\omega_M$ by a signal generator (not shown) of the control arrangement 38.

Figure 8C:
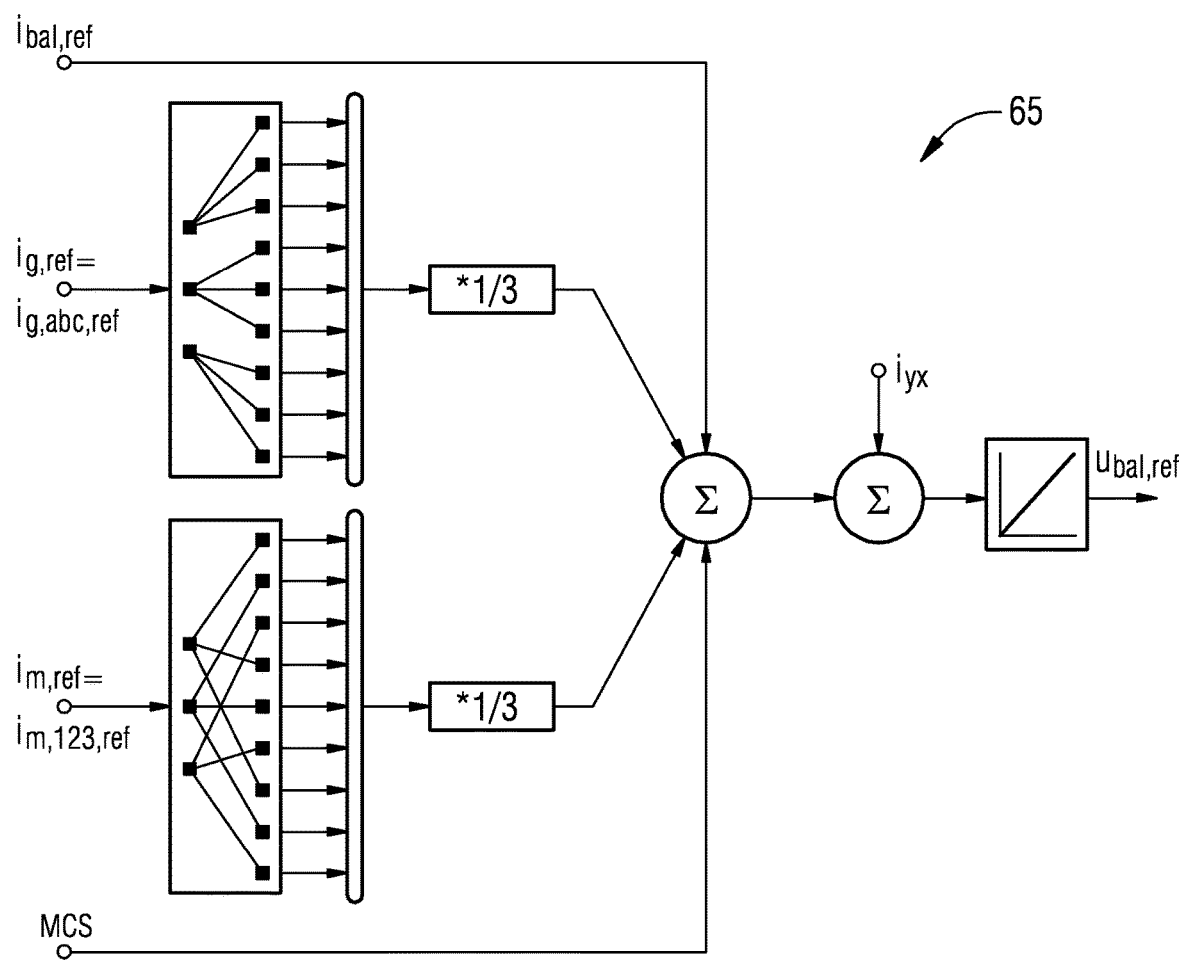

FIG. 8C shows an exemplary embodiment of details of a control arrangement 38 of a converter 10 which is a further development of the embodiments shown above. The inside of the current control module 65 is the shown in FIG. 8C, assuming that the order of the phase-legs 21 to 29 is [1a, 2a, 3a, 1b, 2b, 3b, 1c, 2c, 3c]. The current control module 65 is configured such that the mode control signal MCS provides a circulating current. In FIG. 8C, the symbol for a sum can mean either additions or subtractions of the input signals. The mode control signals MCS may have the form of current mode control signals $i_{MCS}$. The current control module 65 generates the balance voltage reference signals $u_{bal,ref}$ as a function of a sum or a difference of the phase-leg measured current signals $i_{yx}$ and of other signals. The current control module 65 generates the other signals as a sum or difference of the first side current reference signals $i_{g,ref}$ (e.g. divided by a factor three), the second side current reference signals $i_{m,ref}$ (e.g. divided by a factor three), the current balance reference signals $i_{bal,ref}$ and the mode control signals MCS. The two steps of forming a sum or difference can be combined or can be divided in several steps. The balance voltage reference signals $u_{bal,ref}$ are achieved by multiplying the results of the two steps of forming a sum or difference with a multiplication factor. Thus, the current control module 65 implements a P controller.

Figure 8D:
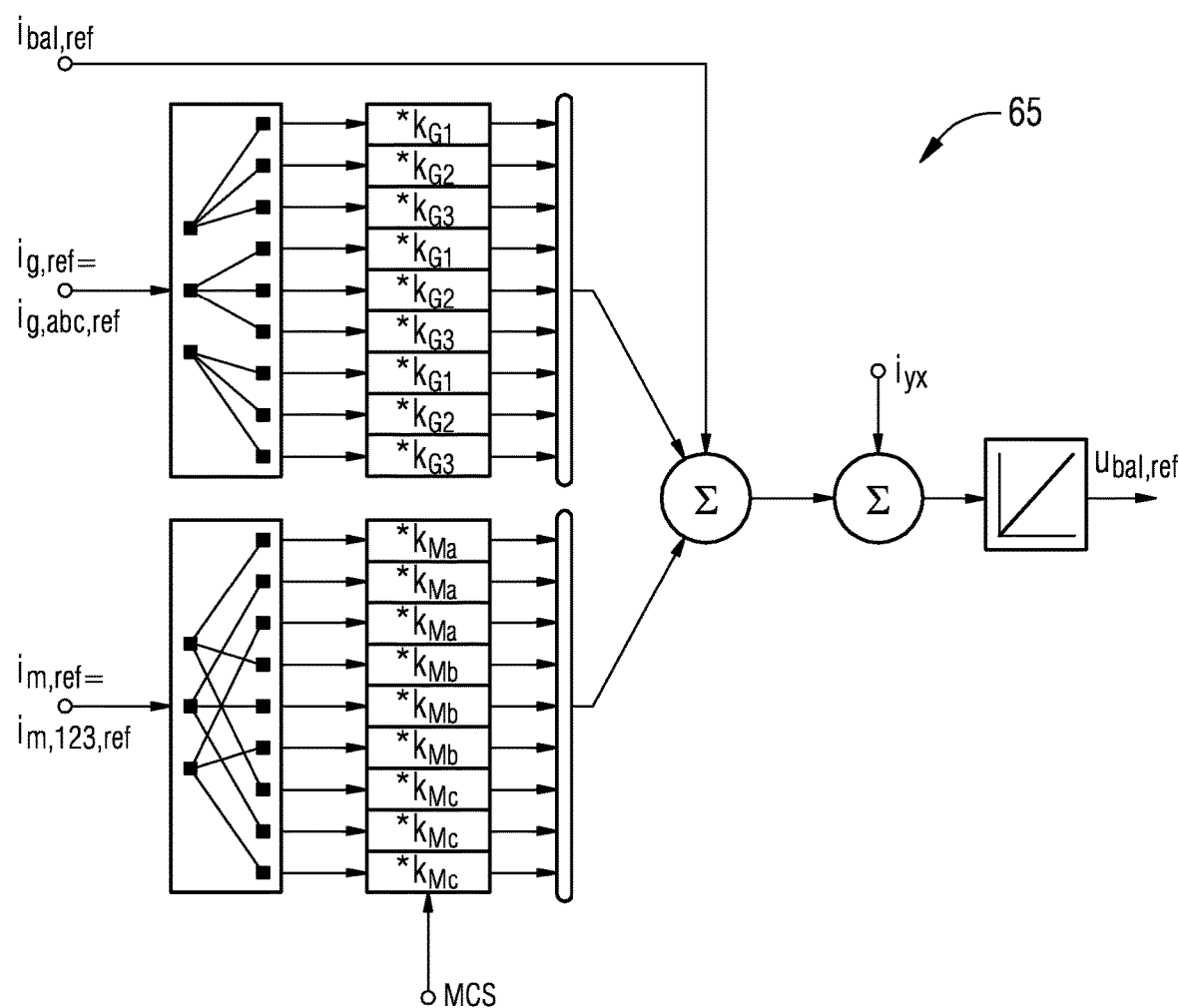

FIG. 8D shows an exemplary embodiment of details of a control arrangement 38 of a converter 10 which is a further development of the embodiments shown above. By looking at the equation (4.0) above, one sees that $k_M$ is a vector 1×3 with indices a,b,c and $k_G$ a vector 1×3 with indices 1,2,3. Comparing with FIG. 8C, it could be seen as replacement of the mappings for the grid and machine currents that incorporates the mode control signals MCS having the form of current mode control signals $i_{MCS}$. In FIG. 8D, a modified example of the current control module 65 is shown, in case of modified third method from equation (4.0). The symbol for a sum can mean either additions or subtractions of the input signals. The corresponding circulating currents with the first to the fourth circulating current amplitudes $i_{\alpha\alpha}$, $i_{\alpha\beta}$, $i_{\beta\alpha}$, $i_{\beta\beta}$ can be defined after transformation to the same $\alpha\alpha/\alpha\beta/\beta\alpha/\beta\beta$ frame as the difference between the original grid and machine side reference currents from FIG. 8C and the grid and machine side currents from FIG. 8D. Hence, the two methods are identical.

The current control module 65 generates the balance voltage reference signals $u_{bal,ref}$ as a function of a sum or a difference of the phase-leg measured current signals $i_{yx}$ and of other signals. The current control module 65 generates the other signals as a sum or difference of the first side current reference signals $i_{g,ref}$ (each signal multiplied by one of three factors $k_{G1}$, $k_{G2}$, $k_{G3}$), the second side current reference signals $i_{m,ref}$ (each signal multiplied by one of other three factors $k_{Ma}$, $k_{Mb}$, $k_{Mc}$) and the current balance reference signals $i_{bal,ref}$. The factors $k_{G1}$, $k_{G2}$, $k_{G3}$ and the other factors $k_{Ma}$, $k_{Mb}$, $k_{Mc}$ are a function of the mode control signals MCS. The two steps of forming a sum or difference can be combined or can be divided in several steps. The balance voltage reference signals $u_{bal,ref}$ are achieved by multiplying the results of the two steps of forming a sum or difference with a multiplication factor. Thus, the current control module 65 implements a P controller.

Figure 9A:
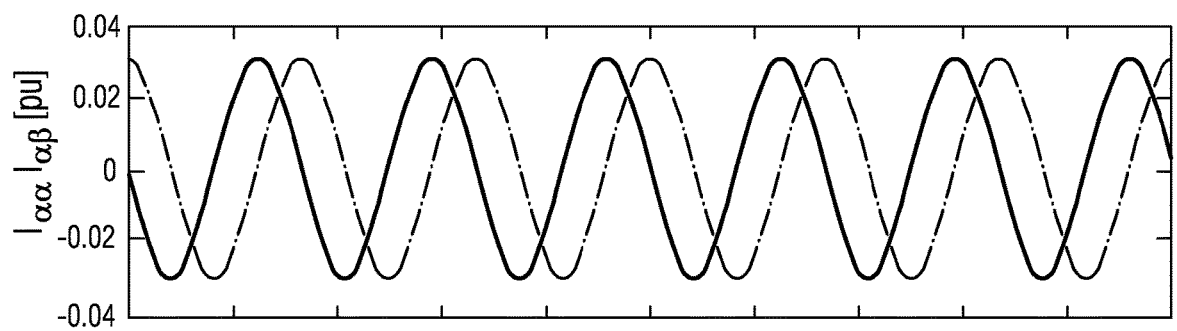
Figure 9B:
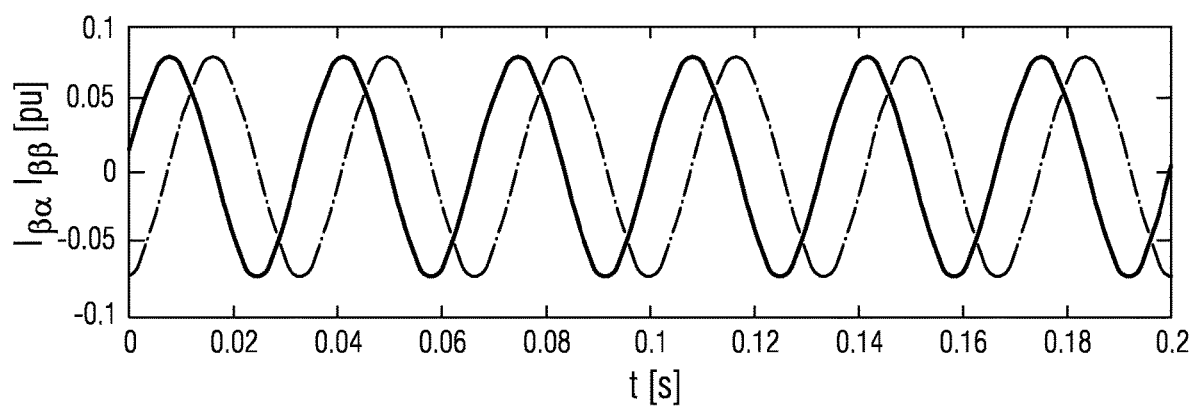

FIGS. 9A and 9B show exemplary embodiments of current signals of a converter 10 as described above and using FIGS. 8A to 8D. In FIGS. 9A and 9B, the first to the fourth circulating current signal with the first to the fourth circulating current amplitudes $\hat{i}_{\alpha\alpha}^M$, $\hat{i}_{\beta\alpha}^M$, $\hat{i}_{\alpha\beta}^M$, $\hat{i}_{\beta\beta}^M$ are shown which are obtained with the alternate implementation of the third method for the same case as in FIG. 8A to 8E.

In a development, a transition between the methods is performed. A seaming less transition between the methods is possible, for example depending on the machine speed in case zero sequence common mode injection is one of them.

This disclosure proposes a novel balancing control method for a direct 3ph/3ph MMC in case one terminal voltage is zero using either external currents and/or zero sequence voltage. 3ph is the abbreviation for three phase.

This disclosure proposes a balancing control method for a direct 3ph/3ph MMC in case of grid unbalances using either circulating currents and/or zero sequence voltage.

The method described in this disclosure realizes e.g. at least one of the following:
  Control of a direct 3ph/3ph MMC with one terminal voltage equal to zero using the first method. 3ph/3ph MMC is the abbreviation for three phase/three phase modular-multilevel converter.
  Control of a direct 3ph/3ph MMC with one terminal voltage equal to zero using the second method.
  Control of a direct 3ph/3ph MMC with one terminal voltage equal to zero using a combination of the first and the second method with a weighting factor.
  Control of a direct 3ph/3ph MMC under grid unbalance using the third method.
  Control of a direct 3ph/3ph MMC under grid unbalance using a combination of the first and the third method with a weighting factor.
  Control of a direct 3ph/3ph MMC under grid unbalance using a combination of the second and the third method with a weighting factor (for example at low machine speed).
  Control of a direct 3ph/3ph MMC in case the second side 12 is a further ac system, e.g. with a different frequency with respect to the first side 11; for example, the converter 10 performs a 50 Hz-60 Hz ac/ac conversion.

The methods introduced above can be straight-forwardly implemented at a direct 3ph/n-ph MMCs, with n>3. Thus, the number of terminals and phases at the second side 12 of the converter 10 may be larger than three.

The converter 10 is implemented e.g. as a modular-multilevel converter, a matrix converter and/or a direct converter. The converter 10 can be used e.g. for a pumped hydro installation. The converter 10 can be operated in a STATCOM mode. The converter 10 e.g. implements a cascaded control, reduces a voltage ripple, provides energy balancing, provides a capacitor balancing and uses e.g. a circulating current.

Signals mentioned above include e.g. three or nine partial signals.

For example, the following signals include a number M of partial signals (namely a partial signal corresponding to each phase-leg 21 to 29): current balance signals $i_{bal}$, current balance reference signals $i_{bal,ref}$, balance voltage reference signals $u_{bal,ref}$, phase-leg control signals $u_{ref}$.

For example, the following signals include a first number L1 partial signals (namely a partial signal corresponding to each terminal a, b, c at the first side 11): first side current reference signals $i_{g,ref}$, first side voltage reference signals $u_{g,conv,ref}$.

For example, the following signals include a second number L2 partial signals (namely a partial signal corresponding to each terminal 1, 2, 3 at the second side 12): second side current reference signals $i_{m,ref}$, second side voltage reference signals $u_{m,conv,ref}$.

Single signals are e.g. first evaluated current balance signal $i_{bal,e1}$, second evaluated current balance signal $i_{bal,e2}$, third evaluated current balance signal $i_{bal,e3}$, first circulating current amplitude $\hat{i}_{\alpha\alpha}^M$, second circulating current amplitude $\hat{i}_{\beta\alpha}^M$.

The mode control signals MCS include more than one partial signal. The clock signals $u_{pll}$ also include more than one partial signal.

The embodiments shown in the FIGS. 1 to 9 as stated represent exemplary embodiments of the improved converter and method for operating a converter; therefore, they do not constitute a complete list of all embodiments according to the improved converter and method for operating a converter. Actual converters and methods may vary from the embodiments shown in terms of arrangements, devices, modules, cells, phase-legs, steps and signals for example.

LIST OF REFERENCE SIGNS 1, 2, 3 terminal
9 arrangement
10 converter
11 first side
12 second side
13 grid
14 transformer
15 machine
16 generator
17 turbine
18 earth terminal
19 impedance
20 machine disconnector
21 to 29 phase-leg
31 to 36 cell
37 phase-leg reactor
38 control arrangement
41 to 44 semiconductor switch
45 to 48 diode
49 storage arrangement
50 capacitor
61 inner control module
62 reference generator
63 modulator
64 voltage control module
65 current control module
66 first side control module
67 second side control module
74 signal generator
75 decoupling matrix module
76 averaging module
80 rescale module
81 to 83 evaluating module
84 amplification limitation module
85 multiplication module
90, 91 processing module
a, b, c terminal
i current
$i_{bal}$ current balance signals
$i_{bal,e1}$ first evaluated current balance signal $i_{bal,e2}$ second evaluated current balance signal
$i_{bal,e3}$ third evaluated current balance signal
$i_{bal,ref}$ current balance reference signals
$i_{g,abc}$ first side measured current signals
$i_{g,ref}$ first side current reference signals
$i_{m,ref}$ second side current reference signals
$i_{m,123}$ second side measured current signals
$i_{yx}$ phase-leg measured current signals
$i_{\alpha\alpha}^{M}$ first circulating current amplitude
$i_{\beta\alpha}^{M}$ second circulating current amplitude
MCS mode control signal
$p_{ref}$ power-reference signal
S1 to S4 cell control signal
t time
$u_{bal,ref}$ balance voltage reference signals
uC cell voltage
$u_{C\Sigma yn}$ capacitor voltage
$u_{C\rho,yxn}$ measured phase-leg capacitor signals
$u_{g,conv,ref}$ first side voltage reference signals
$u_{m,conv,ref}$ second side voltage reference signals
$u_{pll}$ clock signals
$u_{ref}$ phase-leg control signals
u1 to u9 phase-leg voltage
$\hat{u}_G^0$ common mode voltage amplitude
$\phi_{uG}^0$ common mode voltage angle
$\omega_g$ first side frequency
$\omega_m$ second side frequency
$\omega_{m,ref}$ second side reference frequency

The invention claimed is:

1. A method for operating a converter,
wherein the converter is implemented as a modular-multilevel converter and comprises
a control arrangement and
a first side, a second side and a number M of phase-legs which are arranged between the first side and the second side, wherein each of the number M of phase-legs comprises at least a cell with a capacitor and semiconductor switches,
wherein the converter is realized as a direct AC/AC converter, and
wherein each of the number M of phase-legs comprises a number N of cells which are realized as full bridge cells,
the method comprising:
detecting whether the converter has to be set into one mode of a group comprising:
a static synchronous compensator mode in case a voltage of at least one terminal on the first side of the converter has constantly zero Volt and/or a machine coupled to the second side of the converter has a standstill, or
a grid unbalance mode,
generating mode control signals (MCS) depending on the detected mode,
generating balance voltage reference signals ($u_{bal,ref}$) depending on a first side frequency ($\omega_g$), a second side frequency ($\omega_m$), second side current reference signals ($i_{m,ref}$), measured phase-leg capacitor signals ($u_{C\Sigma,yxn}$) and the mode control signals (MCS) by the control arrangement,
generating a phase-leg control signal ($u_{ref}$) for each of the number M of phase-legs depending on first side voltage reference signals ($u_{g,conv,ref}$), second side voltage reference signals ($u_{m,conv,ref}$) and the balance voltage reference signals ($u_{bal,ref}$) by a reference generator of the control arrangement,
generating cell control signals by a modulator of the control arrangement as a function of the phase-leg control signals ($u_{ref}$), and
providing the cell control signals to the semiconductor switches of the cells.

2. The method of claim 1,
wherein the method comprises:
generating first side current reference signals ($i_{g,ref}$) depending on the mode control signals (MCS) by a first side control module of the control arrangement, and
generating the balance voltage reference signals ($u_{bal,ref}$) by a current control module of an inner control module of the control arrangement depending on the first side current reference signals ($i_{g,ref}$), the second side current reference signals ($i_{m,ref}$) and current balance reference signals ($i_{bal,ref}$).

3. The method of claim 1,
wherein the method comprises generating the balance voltage reference signals ($u_{bal,ref}$) by a current control module of the inner control module of the control arrangement depending on first side current reference signals ($i_{g,ref}$), the second side current reference signals ($i_{m,ref}$), the mode control signals (MCS) and the current balance reference signals ($i_{bal,ref}$).

4. The method of claim 1,
wherein the method comprises:
generating the current balance reference signals ($i_{bal,ref}$) by a decoupling matrix module of the inner control module depending on current balance signals ($i_{bal}$),
generating the current balance signals ($i_{bal}$) by a voltage control module of the inner control module depending on clock signals ($u_{pll}$) and measured phase-leg capacitor signals ($u_{C\Sigma,yxn}$) measured at the cells of the number M of phase-legs, and
generating the clock signals ($u_{pll}$) as a function of the first side frequency ($\omega_g$) and the second side frequency ($\omega_m$) by the inner module.

5. The method of claim 1,
wherein in case the converter is set to the static synchronous compensator mode, the mode control signals (MCS) are generated as a function of a first, a second and a third evaluated current balance signal ($i_{bal,e1}$, $i_{bal,e2}$, $i_{bal,e3}$), wherein the first evaluated current balance signal ($i_{bal,e1}$) depends on current balance signals ($i_{bal}$) of phase-legs which are connected to a first terminal (a) of the first side of the converter,
wherein the second evaluated current balance signal ($i_{bal,e2}$) depends on current balance signals ($i_{bal}$) of phase-legs which are connected to a second terminal (b) of the first side of the converter, and
wherein the third evaluated current balance signal ($i_{bal,e3}$) depends on current balance signals ($i_{bal}$) of phase-legs which are connected to a third terminal (c) of the first side of the converter.

6. The method of claim 5,
wherein the method comprises:
generating the mode control signals (MCS) as a function of rescaled signals and clock signals ($u_{pll}$) by a multiplication module of the rescale module, and
generating the clock signals ($u_{pll}$) as a function of the first side frequency ($\omega_g$) and the second side frequency ($\omega_m$) by the inner control module.

7. The method of one of claim 1,
wherein in case the converter is set to the static synchronous compensator mode, the mode control signals (MCS) are generated as a function of common mode voltage signals, and wherein the common mode voltage signals are generated by a processing module of the control arrangement as a function of measured signals and comprise a common mode voltage amplitude ($\hat{u}_G^0$) and a common mode voltage angle ($\phi_{uG}^0$).

8. The method of claim 7, wherein the method comprises calculating a value of the common mode voltage angle ($\phi_{uG}^0$) and a value of the common mode voltage amplitude ($\hat{u}_G^0$) by:

$$\phi_{uG}^0 = a\tan\frac{k_6k_1 - k_3k_4}{k_3k_5 - k_6k_2}$$

$$\hat{u}_G^0 = \begin{cases} -\dfrac{k_3}{k_1\cos\phi_{uG}^0 + k_2\sin\phi_{uG}^0} \\ \text{or } -\dfrac{k_6}{k_4\cos\phi_{uG}^0 + k_5\sin\phi_{uG}^0} \end{cases}$$

wherein k1 to k6 are values of a first to a sixth parameter which are calculated as a function of the measured signals.

9. The method of claim 5, wherein in case the converter is set to the static synchronous compensator mode, the mode control signals (MCS) are generated as a function of:
rescaled signals and
common mode voltage signals,
with a weighting factor.

10. The method claim 1, wherein in case the converter is set to the grid unbalance mode, the mode control signals (MCS) are generated as a function of a first and a second circulating current signal.

11. The method of claim 10, wherein the method comprises calculating the first circulating current signal and the second circulating current signal by:

$$\hat{i}_{\alpha\alpha}^M = \hat{i}_{\alpha\beta}^M = -\frac{\hat{i}_G^{NS}\hat{u}_G^{PS}\cos(\phi_{iG}^{NS} - \phi_{uG}^{PS}) + \hat{i}_G^{PS}\hat{u}_G^{NS}\cos(\phi_{iG}^{PS} - \phi_{uG}^{NS})}{2\hat{u}_M}$$

$$\hat{i}_{\beta\alpha}^M = \hat{i}_{\beta\beta}^M = \frac{\hat{i}_G^{NS}\hat{u}_G^{PS}\sin(\phi_{iG}^{NS} - \phi_{uG}^{PS}) - \hat{i}_G^{PS}\hat{u}_G^{NS}\sin(\phi_{iG}^{PS} - \phi_{uG}^{NS})}{2\hat{u}_M}$$

$$\phi_{\alpha\alpha}^M = \phi_{uM} + \pi$$

$$\phi_{\alpha\beta}^M = \phi_{uM} + 3\pi/2$$

$$\phi_{\beta\alpha}^M = \phi_{uM}$$

$$\phi_{\beta\beta}^M = \phi_{uM} + \pi/2$$

wherein $\hat{i}_G^{NS}$ is a value of a negative-sequence grid current magnitude,
$\hat{u}_G^{PS}$ is a value of a positive-sequence grid voltage magnitude,
$\phi_{iG}^{NS}$ is a value of a negative-sequence grid current angle,
$\phi_{uG}^{PS}$ is a value of a positive-sequence grid voltage angle,
$\hat{i}_G^{PS}$ is a value of a positive-sequence grid current magnitude,
$\hat{u}_G^{NS}$ is a value of a negative-sequence grid voltage magnitude,
$\phi_{iG}^{PS}$ is a value of a positive-sequence grid current angle,
$\phi_{uG}^{NS}$ is a value of a negative-sequence grid voltage angle, $\hat{i}_{\alpha\alpha}^M$ is a value of a first circulating current amplitude of the first circulating current signal,
$\hat{i}_{\beta\alpha}^M$ is a value of a second circulating current amplitude of the second circulating current signal,
$\phi_{\alpha\alpha}^M$ is a value of a first circulating current angle of the first circulating current signal,
$\phi_{\alpha\beta}^M$ is a value of a third circulating current angle,
$\phi_{\beta\alpha}^M$ is a value of a second circulating current angle of the second circulating current signal,
$\phi_{\beta\beta}^M$ is a value of a fourth circulating current angle and
$\phi_{uM}$ is a value of a second side voltage magnitude.

12. The method of claim 9, wherein in case the converter is set to the grid unbalance mode, the mode control signals (MCS) are generated as a function of:
the first and the second circulating current signal and
the rescaled signals and/or the common mode voltage signals,
with a weighting factor.

13. A converter, comprising:
a control arrangement and
a number M of phase-legs, wherein each of the number M of phase-legs comprises at least a cell with a capacitor and semiconductor switches,
wherein the converter is realized as a modular-multilevel converter and is configured to execute-detecting whether the converter has to be set into one mode of a group comprising:
a static synchronous compensator mode in case a voltage of at least one terminal on the first side of the converter has constantly zero Volt and/or a machine coupled to the second side of the converter has a standstill, or
a grid unbalance mode,
generating mode control signals (MCS) depending on the detected mode,
generating balance voltage reference signals ($u_{bal,ref}$) depending on a first side frequency ($\omega_g$), a second side frequency ($\omega_m$), second side current reference signals ($i_{m,ref}$), measured phase-leg capacitor signals ($u_{C\Sigma,yxn}$) and the mode control signals (MCS) by the control arrangement,
generating a phase-leg control signal ($u_{ref}$) for each of the number M of phase-legs depending on first side voltage reference signals ($u_{g,conv,ref}$), second side voltage reference signals ($u_{m,conv,ref}$) and the balance voltage reference signals ($u_{bal,ref}$) by a reference generator of the control arrangement,
generating cell control signals by a modulator of the control arrangement as a function of the phase-leg control signals ($u_{ref}$), and
providing the cell control signals to the semiconductor switches of the cells.

14. A non-transitory computer program product, comprising instructions to cause a converter to execute:
detecting whether the converter has to be set into one mode of a group comprising:
a static synchronous compensator mode in case a voltage of at least one terminal on the first side of the converter has constantly zero Volt and/or a machine coupled to the second side of the converter has a standstill, or
a grid unbalance mode,
generating mode control signals (MCS) depending on the detected mode,
generating balance voltage reference signals ($u_{bal,ref}$) depending on a first side frequency ($\omega_g$), a second side frequency ($\omega_m$), second side current reference signals ($i_{m,ref}$), measured phase-leg capacitor signals ($u_{C\Sigma,yxn}$) and the mode control signals (MCS) by the control arrangement, generating a phase-leg control signal ($u_{ref}$) for each of the number M of phase-legs depending on first side voltage reference signals ($u_{g,conv,ref}$), second side voltage reference signals ($u_{m,conv,ref}$) and the balance voltage reference signals ($u_{bal,ref}$) by a reference generator of the control arrangement, generating cell control signals by a modulator of the control arrangement as a function of the phase-leg control signals ($u_{ref}$), and providing the cell control signals to the semiconductor switches of the cells.

15. The method of claim 7,
wherein in case the converter is set to the static synchronous compensator mode, the mode control signals (MCS) are generated as a function of:
rescaled signals and the common mode voltage signals,
with a weighting factor.

16. The method of claim 8,
wherein in case the converter is set to the grid unbalance mode, the mode control signals (MCS) are generated as a function of:
the first and the second circulating current signal and rescaled signals and/or the common mode voltage signals,
with a weighting factor.

17. The method of claim 11,
wherein in case the converter is set to the grid unbalance mode, the mode control signals (MCS) are generated as a function of:
the first and the second circulating current signal and rescaled signals and/or common mode voltage signals,
with a weighting factor.

* * * * *